US010691782B2

(12) United States Patent
Yang et al.

(10) Patent No.: US 10,691,782 B2
(45) Date of Patent: Jun. 23, 2020

(54) METHOD OF ACQUIRING BIOMETRIC DATA AND ELECTRONIC DEVICE THEREFOR

(71) Applicant: Samsung Electronics Co., Ltd., Gyeonggi-do (KR)

(72) Inventors: Hyeongwook Yang, Gyeonggi-do (KR); Kyungsoo Lim, Gyeonggi-do (KR); Hyung-Woo Shin, Seoul (KR); Hyemi Lee, Seoul (KR); Heekuk Lee, Gyeonggi-do (KR); Yumin Jung, Gyeonggi-do (KR); Tushar Balasaheb Sandhan, Gyeonggi-do (KR); Pil-Joo Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 163 days.

(21) Appl. No.: 15/854,183

(22) Filed: Dec. 26, 2017

(65) Prior Publication Data
US 2018/0181735 A1 Jun. 28, 2018

(30) Foreign Application Priority Data

Dec. 26, 2016 (KR) .................. 10-2016-0178820

(51) Int. Cl.
*G06F 21/32* (2013.01)
*G06F 21/36* (2013.01)
(Continued)

(52) U.S. Cl.
CPC .............. *G06F 21/32* (2013.01); *G06F 21/36* (2013.01); *H04L 63/0861* (2013.01);
(Continued)

(58) Field of Classification Search
None
See application file for complete search history.

(56) References Cited

U.S. PATENT DOCUMENTS

2008/0133931 A1* 6/2008 Kosaka ................... G06F 21/32
713/186
2009/0292641 A1* 11/2009 Weiss ...................... G06F 21/32
705/66

(Continued)

FOREIGN PATENT DOCUMENTS

| CN | 105224139 A | 1/2016 |
|----|----|----|
| EP | 3 054 399 A1 | 8/2016 |

(Continued)

OTHER PUBLICATIONS

International Search Report dated Apr. 17, 2018.

(Continued)

*Primary Examiner* — Brandon S Hoffman
(74) *Attorney, Agent, or Firm* — Cha & Reiter, LLC

(57) ABSTRACT

An electronic device for acquiring biometric information may include a display, and a fingerprint sensor configured to acquire fingerprint data through at least a partial display region of the display. A processor may execute a first application in which a graphical object is displayed, for controlling a designated function other than a fingerprint registration function. A user input on the graphical object may be used to collect fingerprint information, which is used as part of a fingerprint registration function.

20 Claims, 32 Drawing Sheets

(51) Int. Cl.
*H04W 12/06* (2009.01)
*H04L 29/06* (2006.01)
*G06K 9/00* (2006.01)
*H04L 9/32* (2006.01)

(52) U.S. Cl.
CPC ........ *H04W 12/06* (2013.01); *G06K 9/00006* (2013.01); *H04L 9/3231* (2013.01)

(56) References Cited

U.S. PATENT DOCUMENTS

| | | |
|---|---|---|
| 2013/0287272 A1 | 10/2013 | Lu et al. |
| 2014/0003678 A1 | 1/2014 | Vieta et al. |
| 2014/0003681 A1* | 1/2014 | Wright ............... G06K 9/00013 382/124 |
| 2014/0101737 A1* | 4/2014 | Rhee ....................... G06F 21/32 726/6 |
| 2015/0074615 A1* | 3/2015 | Han ................... G06K 9/00033 715/863 |
| 2015/0161837 A1* | 6/2015 | Smith ................ G07C 9/00158 340/5.53 |
| 2016/0092018 A1* | 3/2016 | Lee ......................... G06F 21/32 345/173 |

FOREIGN PATENT DOCUMENTS

| | | |
|---|---|---|
| KR | 10-2016-0054573 A | 5/2016 |
| WO | 2016/049655 A1 | 3/2016 |

OTHER PUBLICATIONS

"Single-linkage clustering", 2 pages, http://en.wikipedia.org/wiki/Single-linkage_clustering.

Feng, et al.; "Continuous Remote Mobile Identity Management Using Biometric Integrated Touch-Display"; 2012; IEEE; International Symposium on Microarchitecture Workshops.

European Search Report dated Oct. 24, 2019.

Australian Search Report dated Feb. 20, 2020.

* cited by examiner

FINGERPRINT IMAGE INDEX

|   | 1 | 2 | 3 |
|---|---|---|---|
| 1 |   | 0.6 | 0.3 |
| 2 | 0.6 |   | 0.1 |
| 3 | 0.3 | 0.1 |   |

FINGERPRINT IMAGE INDEX

FIG.14C

METHOD OF ACQUIRING BIOMETRIC DATA AND ELECTRONIC DEVICE THEREFOR

CLAIM OF PRIORITY

This application claims the priority under 35 U.S.C. § 119(a) to Korean Patent Application Serial No. 10-2016-0178820, which was filed in the Korean Intellectual Property Office on Dec. 26, 2016, the entire content of which is hereby incorporated by reference.

TECHNICAL FIELD

The present disclosure relates to a method for acquiring biometric data and an electronic device thereof.

BACKGROUND

As performance capabilities of portable electronic devices such as smart phones has steadily risen, a variety of services are now provided through electronic devices. Specifically, in addition to basic services such as telephone calls, text sending, etc., service areas are being expanded with more complex services such as games, instant messaging, document editing, image/video playback and editing, and the like. As a myriad of services are provided through electronic devices, various functions other than simple data input/output and processing are required. In particular, services that require security, such as mobile payment services, may also be provided, and biometric data (e.g., fingerprints, iris scanning, etc.) may be utilized to ensure reliable security.

For example, fingerprint data can be acquired through a fingerprint sensor. In general, the size of the fingerprint sensor embedded in the electronic device is relatively smaller than the size of one's finger. Accordingly, in order to register clear fingerprint information in the electronic device, a user is typically required to inconveniently repeat a process of inputting his fingerprint several times. To improve the recognition rate further, a wide range of fingerprints is acquired, which usually requires about 10 to 20 registration operations per finger. Thus, it takes a considerable time to register the fingerprint, whereby the user is inconvenienced in using the fingerprint function.

SUMMARY

Various embodiments of the present disclosure provide methods for: effectively acquiring biometric data; effectively acquiring fingerprint data; simplifying a registration procedure of biometric and/or fingerprint information; and/or collecting fingerprint data using an application designed for purposes other than fingerprint registration; and electronic devices thereof.

Various embodiments provide a method of acquiring fingerprint data using a general application (e.g., a camera or a telephone application) for purposes other than a fingerprint application that performs fingerprint registration and authentication, and an electronic device thereof.

Various embodiments provide methods of: grouping fingerprint data based on a degree of similarity; and/or utilizing fingerprint data collected in advance in registration of fingerprint information; and electronic devices thereof.

An electronic device according to various exemplary embodiments may include a display and a fingerprint sensor configured to acquire fingerprint data through a display region, where the display region is at least a partial region of an entire display area of the display. A memory may store a first application for performing a designated function other than fingerprint registration and a second application for performing the fingerprint registration. A processor may be configured to: execute the first application, where the execution causes a first graphical object for controlling the designated function to be displayed through the display region; acquire at least one first fingerprint data from a first user input on the first graphical object using the fingerprint sensor; execute the second application which includes acquiring second fingerprint data from a second user input on the display region; and generate fingerprint information about the same user using the at least one first fingerprint data and the second fingerprint data.

An electronic device according to various exemplary embodiments may include a display controlled to display at least one object, a fingerprint sensor configured to acquire fingerprint data through at least a partial region of a display region of the display, and a processor configured to: cause the display to display the at least one object when an application is executed; acquire first fingerprint data representing at least one fingerprint image in response to a touch input on the at least one object; and register the first fingerprint data and reference fingerprint data acquired through at least one other application as fingerprint information.

A method of operating an electronic device according to various exemplary embodiments may comprise displaying at least one object when an application is executed, acquiring first fingerprint data representing at least one fingerprint image in response to a touch input for the at least one object, and registering the first fingerprint data and reference fingerprint data acquired through at least one other application as fingerprint information.

A method for effectively acquiring biometric data and the electronic device thereof according to various embodiments may collect biometric data (e.g., fingerprint data) in advance using an application designed for purposes other than fingerprint registration, thereby simplifying a registration procedure of biometric information.

In addition, the method for effectively acquiring biometric data and the electronic device thereof according to various embodiments may improve usability by simplifying an otherwise cumbersome fingerprint registration process. Fingerprint data can be acquired through a natural user input by using another application instead of registering the fingerprint through a fingerprint registration application, and the fingerprint data acquired in advance can be utilized when fingerprint registration is performed using the fingerprint registration application.

Accordingly, a user's fingerprint can be acquired naturally before execution of a fingerprint function to perform the fingerprint registration, whereby the fingerprint registration process is conveniently simplified. In addition, when images of fingers to be registered are collected in a cluster at the time of fingerprint registration, the collected images are used as registered images to reduce the number of registrations, thereby reducing the registration process. Further, by clustering the collected fingerprint data and using the clustered fingerprint data, it is possible to prevent a phenomenon that fingerprints of different fingers are registered as one fingerprint to cause a decrease in the recognition rate.

BRIEF DESCRIPTION OF THE DRAWINGS

The above and other aspects, features, and advantages of the present disclosure will be more apparent from the following detailed description taken in conjunction with the accompanying drawings, in which:

FIG. 14C illustrates an example of a similarity measurement result of fingerprint data acquired in an electronic device according to various embodiments of the present disclosure;

DETAILED DESCRIPTION

Figure 1:
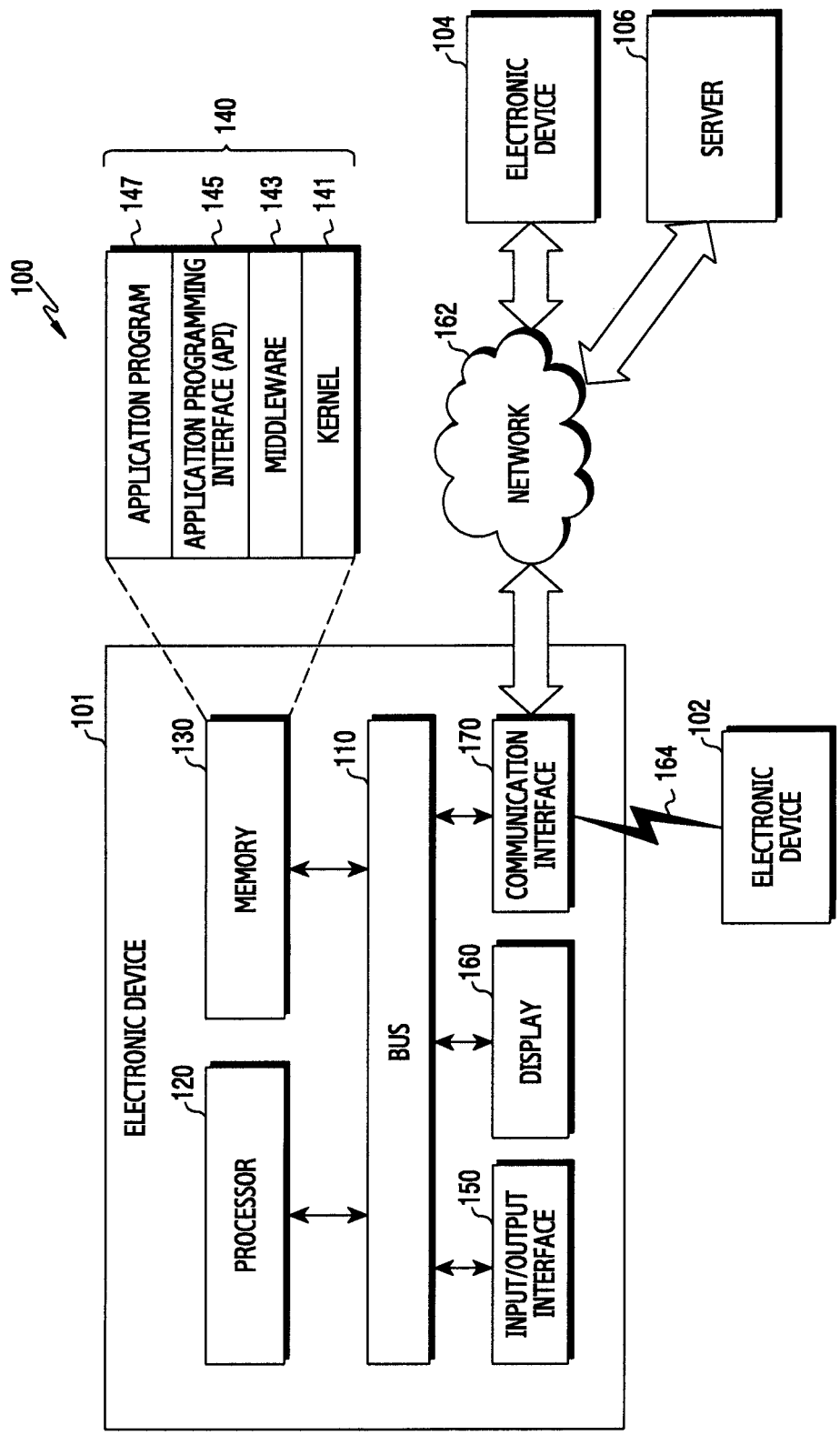
FIG. 1 illustrates an electronic device within a network environment according to various embodiments of the present disclosure.

Hereinafter, various embodiments of the present document are described below with reference to the accompanying drawings. Description of any embodiment and the terms used to describe the same do not intend to limit the technology in accordance with the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the former constituent element may be directly coupled to the latter constituent element, or coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

Examples of an electronic device according to various embodiments of the present document include but are not limited to a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. Wearable device examples include an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In other embodiments, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.). According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 is a block diagram of a network environment system, 100, according to an embodiment of the present disclosure. An electronic device 101 is disposed within network environment 100. The electronic device 101 may include a bus 110, a processor 120, a memory 130, an input output interface 150, a display 160, and a communication interface 170. In some embodiments, the electronic device 101 may omit at least one of the constituent elements or additionally have another constituent element(s). The bus 110 may, for example, include a circuit coupling the constituent elements 110, 120, 150, 160 and 170 with one another and forwarding communication (e.g., a control message or data) between the constituent elements. The processor 120 may include one or more of a central processing unit (CPU), an application processor (AP) or a communication processor (CP). The processor 120 may, for example, execute operation or data processing for control and/or communication of at least one another constituent element of the electronic device 101.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests. The API 145 is, for example, an interface enabling the application program 147 to control a function provided by the kernel 141 or the middleware 143 and may, for example, include at least one interface or function (e.g., an instruction) for file control, window control, image processing, character control or the like. The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like. The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, in the case where the electronic device 101 performs some function or service automatically or in response to a request, the electronic device 101 may, instead of or additionally to executing the function or service by itself, send a request for execution of at least a partial function associated with the same to another device (e.g., electronic device 102, 104 or server 106). The latter electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
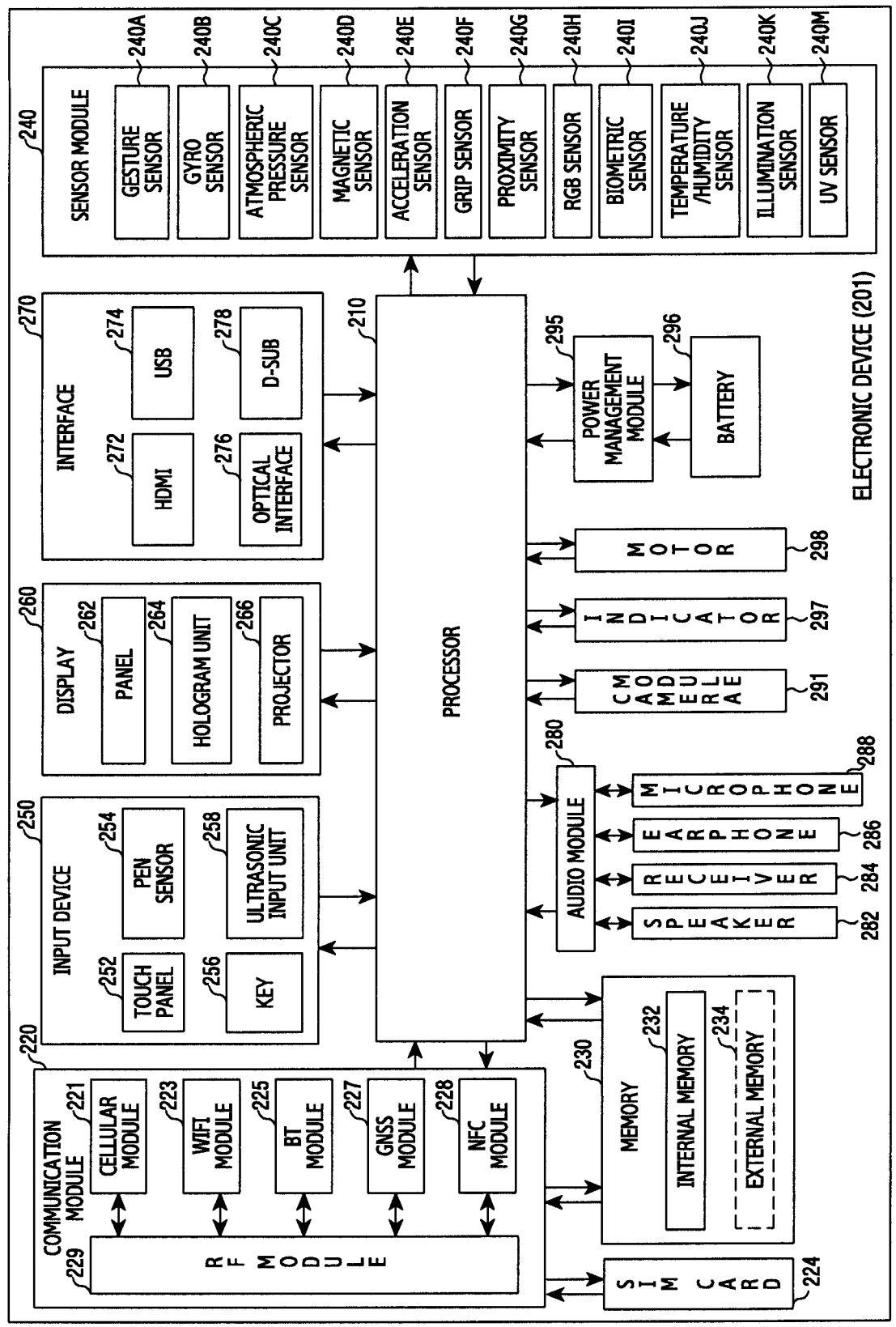
FIG. 2 is a block diagram illustrating an electronic device according to various embodiments of the present disclosure.

FIG. 2 is a block diagram of an electronic device 201 according to an embodiment of the present disclosure. Electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction as the communication interface 170. The communication module 220 may, for example, include a cellular module 221, a WiFi module 223, a Bluetooth module 225, a GNSS module 227, an near field communication (NFC) module 228, and a radio frequency (RF) module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module. The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature/humidity sensor 240J, an illuminance sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, and/or a control circuit for controlling them. The panel 262 may, for example, be implemented to be flexible, transparent, or wearable. The panel 262 may be constructed as one or more modules together with the touch panel 252. The hologram device 264 may show a three-dimensional image to the air using an interference of light. The projector 266 may project light onto a screen, to display an image. The screen may, for example, be located inside or outside the electronic device 201. The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like. The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like). The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), media-Flo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
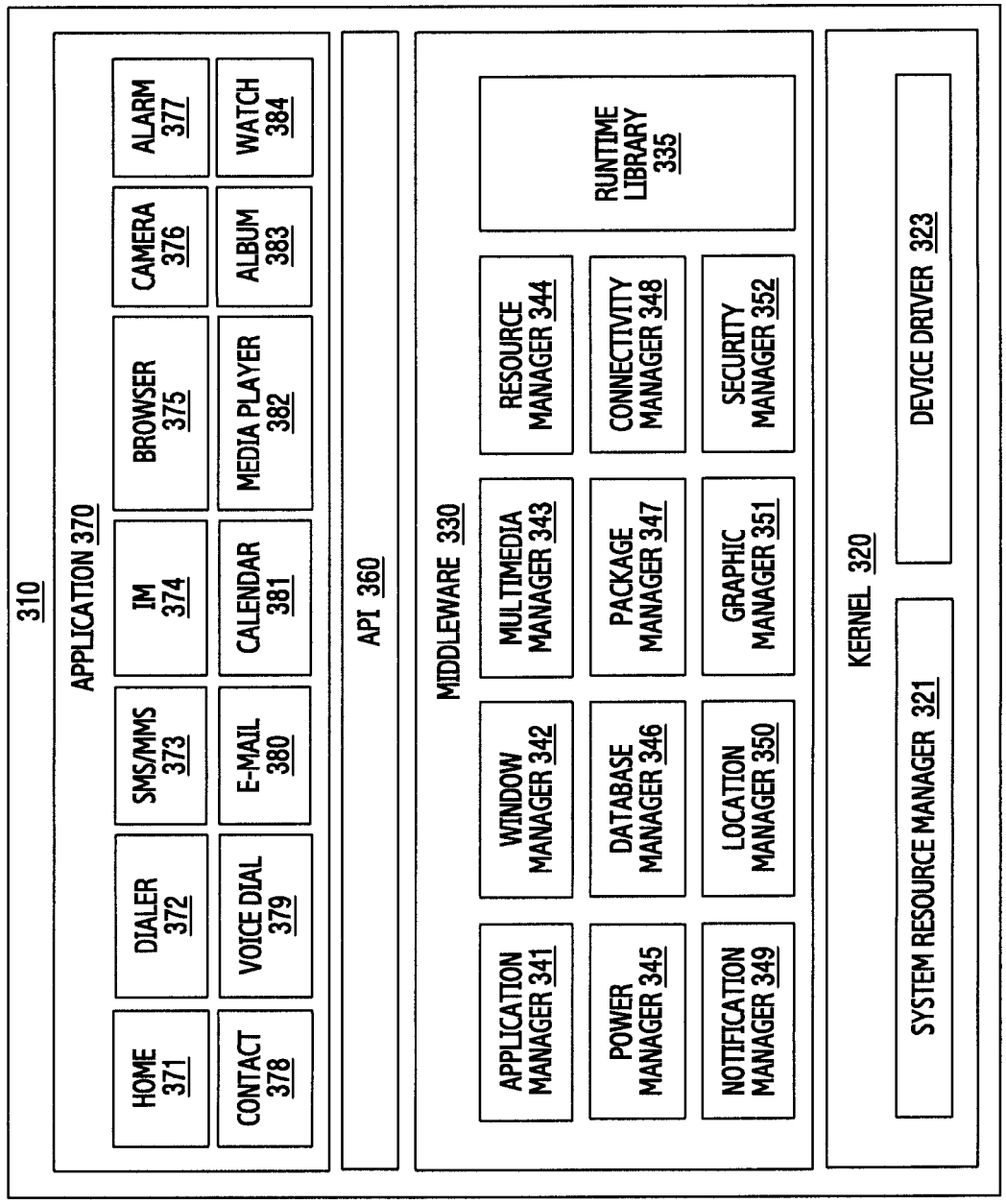
FIG. 3 is a block diagram illustrating a program module according to various embodiments of the present disclosure.

FIG. 3 is a block diagram of a program module 310 according to an embodiment of the present disclosure. Program module 310 (e.g., the program 140) may include an Operating System (OS) for controlling resources related to an electronic device (e.g., the electronic device 101) and/or various applications (e.g., the application program 147) driven on the operating system. The operating system may, for example, include Android™, iOS™, Windows™, Symbian™, Tizen™ or Bada™. Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the electronic device 102, 104, the server 106, etc.).

The kernel 320 may, for example, include a system resource manager 321 and/or a device driver 323. The system resource manager 321 may perform control of a system resource, allocation thereof, recovery thereof or the like. According to an embodiment, the system resource manager 321 may include a process management unit, a memory management unit or a file system management unit. The device driver 323 may, for example, include a display driver, a camera driver, a Bluetooth driver, a shared memory driver, a USB driver, a keypad driver, a WiFi driver, an audio driver or an inter-process communication (IPC) driver. The middleware 330 may, for example, provide a function that the application 370 commonly needs, or provide various functions to the application 370 through the API 360 so that the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input output management, memory management or arithmetic function processing. The application manager 341 may, for example, manage a lifecycle of the application 370. The window manager 342 may manage a graphic user interface (GUI) resource used by a screen. The multimedia manager 343 may detect a format required for playing media files, and perform encoding or decoding of the media file by using a codec suitable to the corresponding format. The resource manager 344 may manage a source code of the application 370 or a space of a memory. The power manager 345 may, for example, manage a battery capacity or a power supply, and provide power information required for an operation of an electronic device. According to an embodiment, the power manager 345 may interwork with a basic input/output system (BIOS). The database manager 346 may, for example, create, search or change a database that will be used by the application 370. The package manager 347 may manage installation or updating of an application that is distributed in a form of a package file.

The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication. According to an embodiment, the middleware 330 may include a telephony manager for managing a voice or video telephony function of an electronic device, or a middleware module capable of forming a combination of functions of the aforementioned constituent elements. According to an embodiment, the middleware 330 may provide a module that is specialized based on the type of an operating system. The middleware 330 may dynamically delete some of the existing constituent elements or add new constituent elements. The API 360 is, for example, a set of API programming functions, and may be provided to have another construction in accordance with the operating system. For example, Android or iOS may provide one API set by platform, and Tizen may provide two or more API sets by platform.

The application 370 may, for example, include a home 371, a dialer 372, a short message service (SMS)/multimedia messaging service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar or the like), or an environment information (e.g., air pressure, humidity or temperature information) provision application. According to an embodiment, the application 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device. According to an embodiment, the application 370 may include an application (e.g., a health care application of a mobile medical instrument) designated according to an attribute of the external electronic device. According to an embodiment, the application 370 may include an application received from the external electronic device. At least a part of the program module 310 may be implemented (e.g., executed) by software, firmware, hardware (e.g., the processor 210) or any combination thereof and may include a module for performing one or more functions, a program, a routine, sets of instructions or a process.

As discussed above, an electronic device according to various embodiments may acquire biometric data using a biometric sensor 240I and may register biometric information based on the acquired biometric data. The present disclosure can be applied to various kinds of biometric information such as fingerprint, iris, heart rate, blood pressure, body temperature, and the like. However, for the sake of concrete description, a fingerprint is presented as an example of biometric information. It should be noted, however, that various embodiments described below can be applied to other biometric information.

First, some terms used in the following description are defined as follows.

A "fingerprint" is an example of biometric information, which refers to a pattern formed by curves formed on the skin existing on the tip of the finger of a human body. A "fingerprint" also refers to a curved pattern that remains on the surface of an object when the tip of the finger is pressed against the object.

"Fingerprint data" refers to data representing all or a part of a fingerprint obtained by a sensor (for example, biometric sensor 240I) included in the electronic device 101. Specifically, "fingerprint data" may refer to a measurement value of the sensor, data generated from the measurement value of the sensor, data in a stored state, or the like. The fingerprint data can represent or be acquired in the form of an image. Accordingly, an individual data unit (chunk) constituting the fingerprint data may be referred to as a "fingerprint image". That is, the fingerprint data is a set of at least one fingerprint image. However, the form of the fingerprint data to which the present disclosure can be applied is not limited to an image. In various embodiments, the fingerprint data may be an object that is generated by the fingerprint sensor, grouped, or used for fingerprint registration.

A "group of fingerprint data" (interchangeably, "group" for brevity) is a set of fingerprint data having more than a certain degree of similarity, that is, a set of at least one fingerprint image. For example, the group may be a set of fingerprint data for a fingerprint of the same finger. That is, the group may be a set of fingerprint data determined to have relevance according to comparison and analysis of the fingerprint data. Also, the group may refer to a set of the fingerprint data in a pre-registration state. The group may be referred to as a "cluster", "collected fingerprint data", "classified fingerprint data", "unregistered fingerprint data", or other terms having technical meanings equivalent thereto.

"Fingerprint information" refers to a set of fingerprint data that is available for authentication. For example, the fingerprint information may be a set of fingerprint data for a fingerprint of the same finger, and may be a set of fingerprint data that has undergone a fingerprint registration procedure. The fingerprint information may be generated through the fingerprint registration procedure, and may include fingerprint data obtained through a fingerprint registration application and fingerprint data obtained through at least one other application. A template can be referred to as "registered fingerprint data", "template", or other terms having technical meanings equivalent thereto.

A "reference fingerprint image" refers to a fingerprint image that serves as a reference for selecting previously collected fingerprint images when the fingerprint information is registered. The reference fingerprint image may be determined by a fingerprint input through the fingerprint registration application. That is, the reference fingerprint image may specify a finger to be used for fingerprint registration. The reference fingerprint image may be referred to as a "reference image", "reference fingerprint", "reference information", or other terms having technical meanings equivalent thereto.

The "fingerprint registration application" is an application designed to provide functions for registering the fingerprint information. The fingerprint registration application may provide a function for determining the reference fingerprint image. In some cases, the fingerprint registration application may provide a function related to fingerprint authentication. The fingerprint registration application may be referred to as a "fingerprint application", "fingerprint authentication application", or other terms having technical meanings equivalent thereto.

Figure 4:
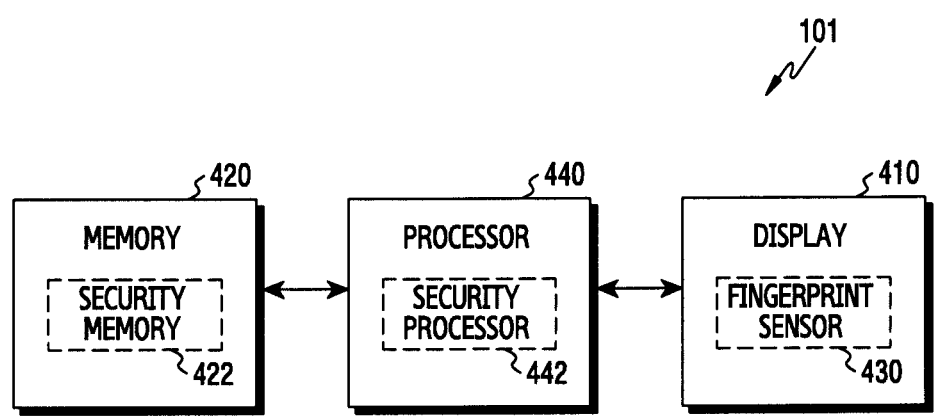
FIG. 4 illustrates a functional configuration of an electronic device according to various embodiments of the present disclosure.

FIG. 4 illustrates a functional configuration of an electronic device, 101, according to various embodiments of the present disclosure. Electronic device 101 may include, for example, a display 410, a memory 420, a fingerprint sensor 430, and a processor 440. A portion of the memory 420 may be used as a security memory 422 and the processor 440 may include a security processor 432.

The display 410 may be a device for displaying a screen of the electronic device 101. For example, the display 410 may be constituted of at least one of an OLED, a quantum-dot light emitting diode (QLED), and an LCD. The display 410 may be a component corresponding to a display 160 of FIG. 1 and a display 260 of FIG. 2.

The memory 420 may store data such as a basic program for the operation of the electronic device 101, an application program, setting information, and the like. The memory 420 may be configured as a volatile memory, a non-volatile memory, or a combination of the volatile memory and the non-volatile memory. The memory 420 may provide stored data according to a request of the processor 440. The memory 420 may store fingerprint data acquired through a fingerprint sensor 430 and may store registered fingerprint information. The security memory 422 may be defined as a memory area of specific address values as a physical part of the memory 420. The security memory 422 may provide enhanced protection against the stored data by allowing restricted access, unlike other areas. That is, the security memory 422 may be defined for a trust execution environment (TEE). In other words, in the memory 420, the security memory 422 and the remainder may have different security levels. Thus, according to an embodiment, the registered fingerprint information may be stored in the security memory 422. According to another embodiment, the security memory 422 may be used to store the collected fingerprint data in a pre-registration state.

The fingerprint sensor 430 may be a component for acquiring fingerprint data of a user. The fingerprint sensor 430 may generate measurement values for a fingerprint when the user inputs a touch. In various embodiments of the present disclosure, the fingerprint sensor 430 has a structure integrated into the display 410. Accordingly, the fingerprint sensor 430 may be referred to as a "display integrated fingerprint-sensor". For example, the fingerprint sensor 430 may be designed according to one of an in/on-cover glass structure in which a sensing module or an electrode for fingerprint sensing is arranged on the surface of a cover glass provided on the display 410 to protect the display 410 through printing or etching, an over-display structure in which a sensing module or an electrode for fingerprint sensing is installed on a display panel, an under-display structure in which a sensing module or an electrode for fingerprint sensing is installed under a display panel, and an in-display structure in which a sensing module or an electrode for fingerprint sensing is installed inside pixels of a display panel or installed in a black maker (BM) region between the pixels.

The processor 440 may control the overall operations of the electronic device 101. For example, the processor 440 may control a screen display of the display 410, and may control a measurement operation of the fingerprint sensor 430. The processor 440 may generate fingerprint data using measurement values generated by the fingerprint sensor 430. According to various embodiments of the present disclosure, the processor 440 may induce a user's touch input to a region corresponding to the fingerprint sensor 430 using an object (e.g., a button, etc.) for application. Here, the region corresponding to the fingerprint sensor 430 may include a physical range including all or a part of a region in which the fingerprint sensor 430 is installed from an active region of the display 410. For example, processor 440 may control functions for acquiring fingerprint data and for registering fingerprint information according to various embodiments described below. Further, the processor 440 may include a security processor 442 to provide enhanced security of a fingerprint registration procedure. The security processor 442 may be an independent processor installed within the processor 440, or may be a set of instruction registers separately defined for a processing requiring security. The processor 440 may include a processor 120 of FIG. 1 and a processor 210 of FIG. 2.

According to various embodiments of the present disclosure, the processor 440 may execute a general application to display contents corresponding to a general application through the display 410, and may display an object associated with the contents in a region in which the fingerprint sensor 430 is located. The processor 440 may receive a touch input for the object, may acquire fingerprint data from the received touch input, and may store the fingerprint data in a first storage space of the memory 420. When a fingerprint is registered by executing the fingerprint registration application, the processor 440 may compare the fingerprint data acquired from the user with fingerprint data previously stored in the first storage space, and may register, when there is a matching fingerprint candidate, a fingerprint using the corresponding fingerprint candidate, that is, may store the fingerprint in a second storage space. The first storage space and the second storage space may be separate storage spaces, and may be separated through flags indicating before registration and completion of registration inside one storage space. According to an embodiment, the second storage space may be allocated in the security memory 422, and the first storage space may be allocated in a memory space other than the security memory 422. In other words, the first storage space and the second storage space may be managed by different security levels. According to another embodiment, both the first storage space and the second storage space may be allocated in the security memory 422.

In the configuration of the electronic device 101 described with reference to FIG. 4, the fingerprint sensor 430 may generate data on the fingerprint of the user. The fingerprint sensor 430 can operate according to a method such as an optical, electrostatic, or ultrasonic method. In the optical method, a fingerprint is obtained by capturing an image of the fingerprint on the finger surface using a photosensitive diode. In the electrostatic method, a phenomenon in which portions (ridges) in which a fingerprint touches an electrode is detected and portions (valleys) in which the fingerprint does not touch is not detected is used. In the ultrasonic method, an ultrasonic wave is generated using, for example, a piezo and a fingerprint is acquired using a path difference of the ultrasonic wave reflected on the valleys and ridges of the fingerprint. Hereinafter, each of the above-described methods will be described in more detail with reference to FIG. 5A, FIG. 5B, and FIG. 5C.

Figure 5A:
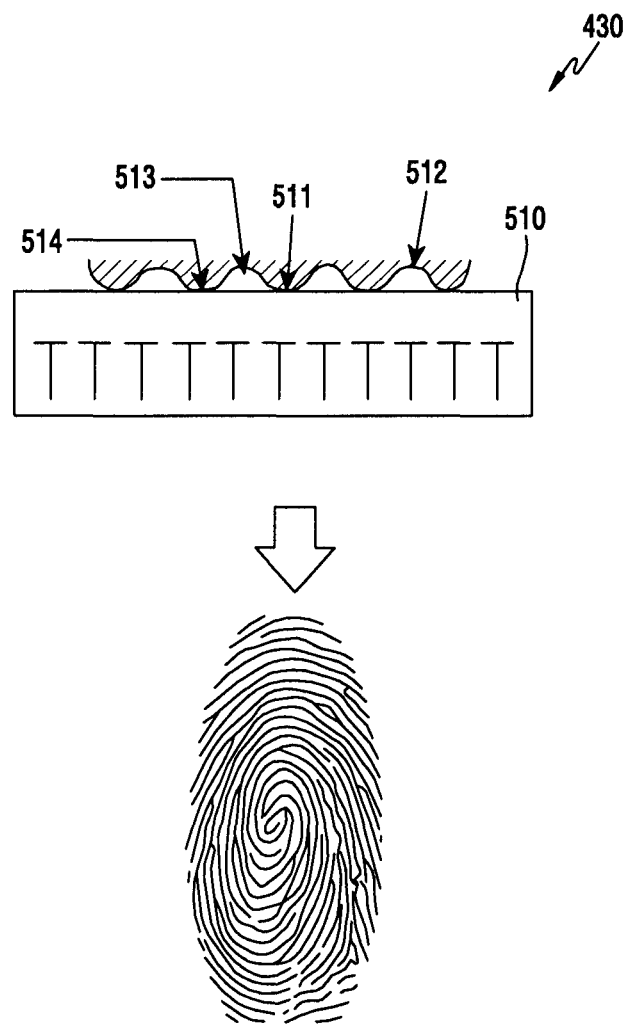
FIG. 5A, FIG. 5B and FIG. 5C illustrate respective examples of a fingerprint sensor for fingerprint recognition in an electronic device according to various embodiments of the present disclosure.
Figure 5B:
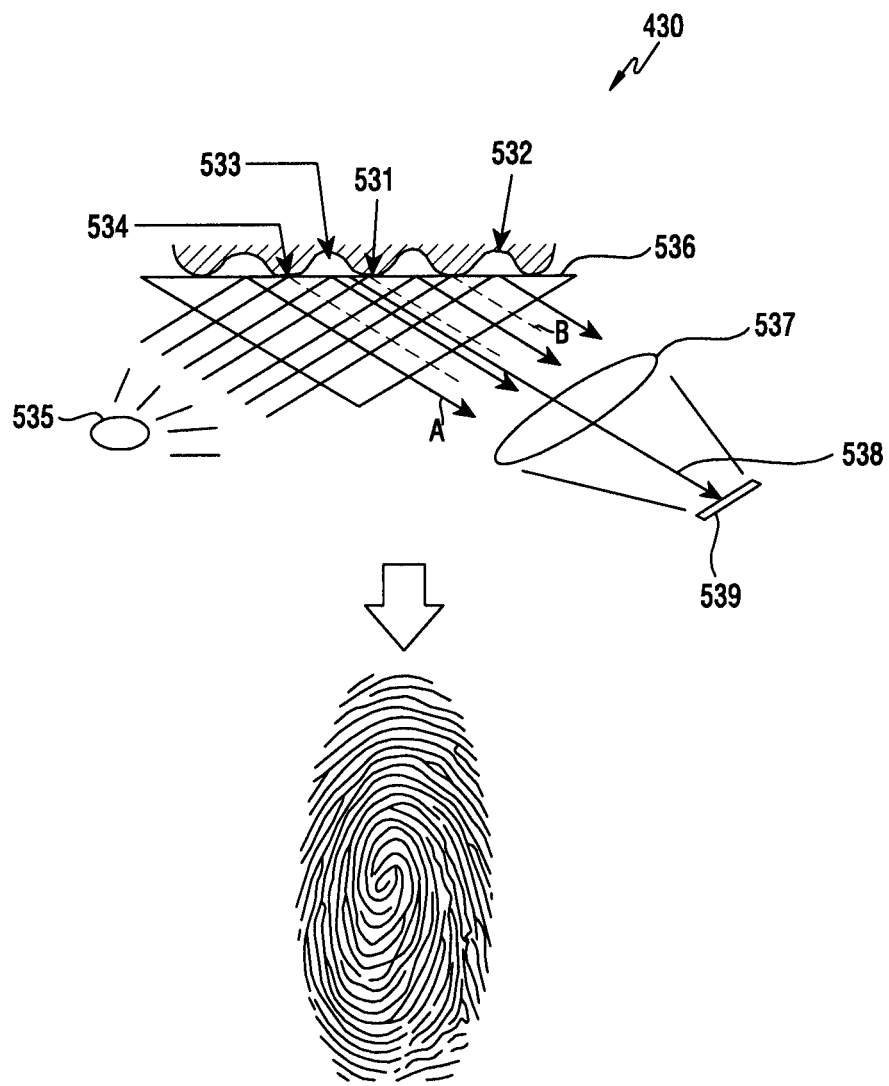
Figure 5C:
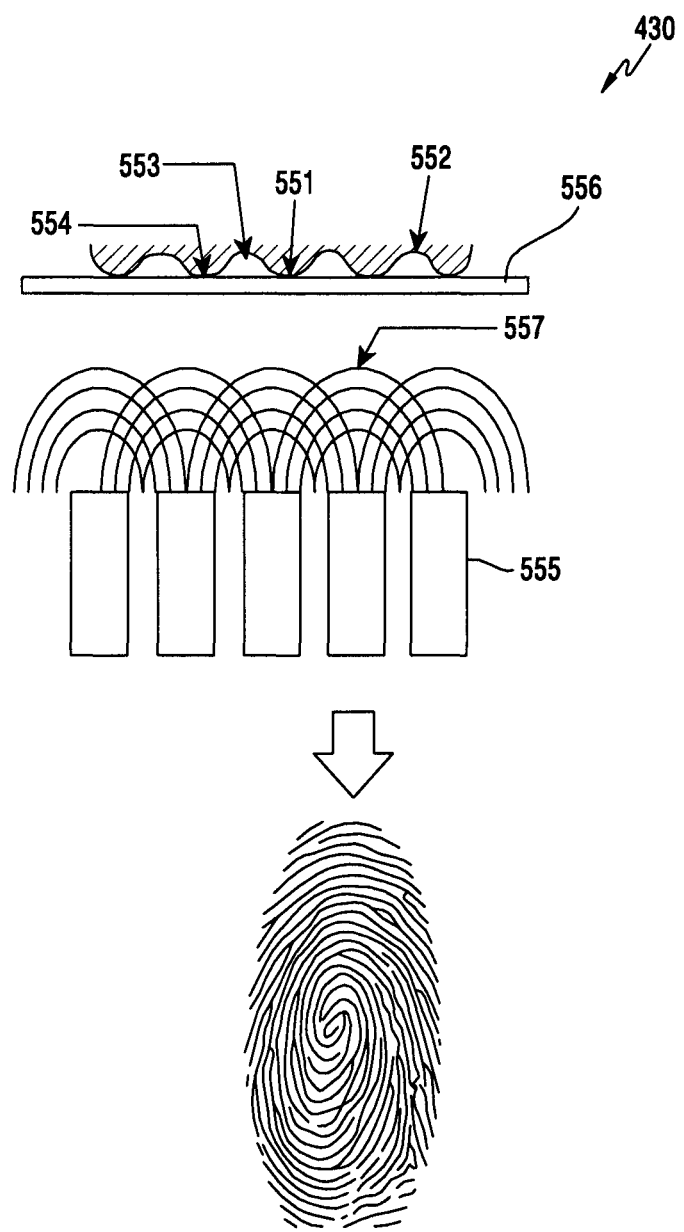

FIG. 5A, FIG. 5B, and FIG. 5C illustrate examples of a fingerprint sensor for fingerprint recognition in an electronic device according to various embodiments of the present disclosure.

FIG. 5A illustrates a capacitive sensor. The fingerprint sensor 430 shown in FIG. 5A may include a micro-capacitor plate 510. The fingerprint sensor 430 may detect a difference between a voltage of a contact point 514 of a region in which a ridge 511 of a finger surface on the micro-capacitor plate 510 is located and a voltage of an air region 513 of a region in which a valley 512 of the finger surface is located. The fingerprint sensor 430 may transmit information about the voltage difference to the processor 440, and the processor 440 may generate fingerprint data from the information transmitted from the fingerprint sensor.

FIG. 5B illustrates a structure using light. The fingerprint sensor 430 may identify a location of a ridge 531 and a location of a valley 532 in a region in which a touch is generated based on information about light emitted from a light source 535 and passed through a glass prism 536 and a lens 537. More specifically, the light source 535 may emit light for detecting a fingerprint, and the light emitted from the light source 535 may be incident on the glass prism 536. Here, when the light incident on the glass prism 536 reaches an air region 533 without the occurrence of contact, the light may be regularly reflected at an angle of reflection equal to an incident angle and may form an optical path A. On the other hand, when the light incident on the glass prism 536 reaches a contact point 534, the light may not be reflected but may be absorbed to fail to form an optical path B. Light reflected in the air region 533 may be refracted through the lens 537 and may reach a photodetector 539. The photodetector 539 may identify a region in which light reaches as a region in which the valley 532 where no contact occurs is located and may identify a region in which light does not reach as a region in which the ridge 531 where contact occurs is located. The photodetector 539 may be implemented using a charge coupled device (CCD) or a complementary metal-oxide-semiconductor (CMOS).

FIG. 5C illustrates a structure using an ultrasonic wave. As shown in FIG. 5C, the fingerprint sensor 430 may include at least one transducer 555. The transducer 555 may emit an ultrasonic signal 571 to a display panel 556 and may convert the ultrasonic signal reflected from the display panel 556 into an electric signal to generate a signal for identifying a touch pattern on the display panel 556. More specifically, out of the ultrasonic signal, the ultrasonic signal reflected from a region 551 in which the ridge is located reaches the transducer 555 faster than the ultrasonic signal reflected from a region 552 in which the valley is located, and the transducer 555 may generate an electric signal reflecting a difference in arrival time of the ultrasonic signal. The transducer 555 may transmit the generated electrical signal to the processor 440 and the processor 440 may obtain fingerprint information from the transmitted signal.

In general, detection sensitivity of the fingerprint may vary greatly depending on a distance from a touch input. In other words, when the fingerprint sensor is installed at a predetermined distance or more from a position at which the touch input occurs, the detection sensitivity is lowered, and a fingerprint having an accuracy higher than a certain level may not be detected. Accordingly, for more precise detection, as shown in FIG. 5A, the fingerprint sensor based on the capacitive sensor may be located in a relatively close region (for example, a region having a depth of 50 μm or less) compared to the outer surface of the panel of the display 410 and other fingerprint sensors (e.g., optical sensor, ultrasonic sensor, etc.). On the other hand, since the structure of FIG. 5B uses light, it may be installed in a region having a larger depth from the surface of the display panel, compared to the capacitive sensor of FIG. 5A. For example, the photodetector 539 may be installed at a location separated by 1000 μm from the surface of the display panel, although other separation distances are possible. In addition, the fingerprint sensor using the ultrasonic waves of FIG. 5C may be installed in a deeper region from the surface of the display panel than the fingerprint sensor having the structure of FIG. 5A or 5B.

Figure 6A:
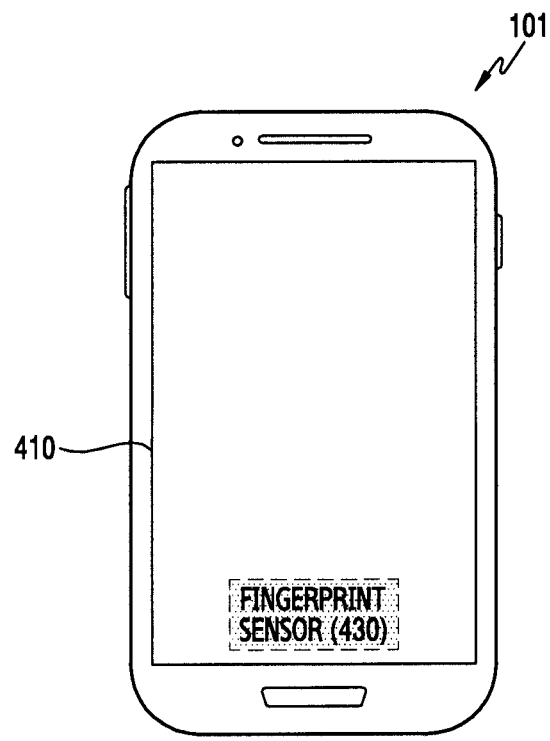
FIG. 6A and FIG. 6B illustrate respective installation examples of a fingerprint sensor in an electronic device according to various embodiments of the present disclosure.
Figure 6B:
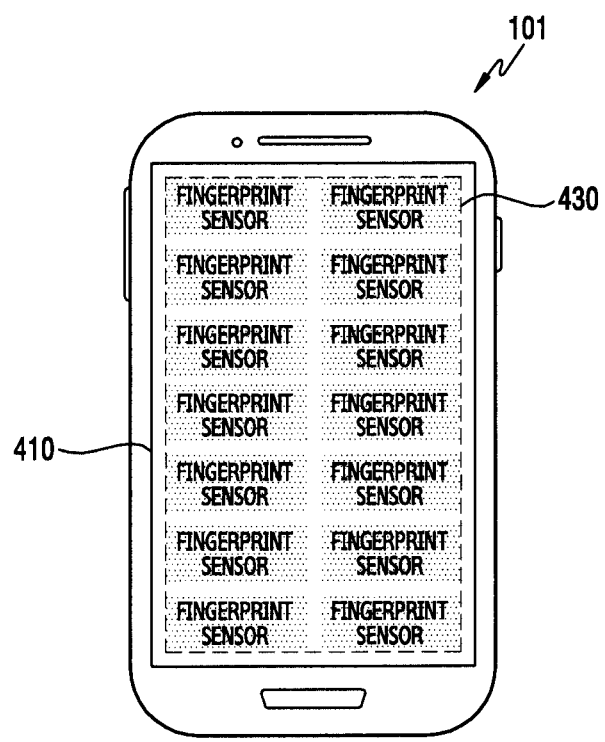

In the configuration of the electronic device 101 described with reference to FIG. 4, the fingerprint sensor 430 may be installed in an integrated form on the display 410. More specifically, the fingerprint sensor 430 may be installed as shown in FIG. 6A or FIG. 6B. FIG. 6A and FIG. 6B illustrate installation examples of a fingerprint sensor in an electronic device according to various embodiments of the present disclosure.

Referring to FIG. 6A, the fingerprint sensor 430 is located in a partial region of the panel of the display 410 and fingerprint recognition of the electronic device 101 may be performed through the partial region. Since the fingerprint sensor 430 is located in only the partial region rather than the entire region of the display panel, the cost for the production process may be reduced. Here, a region in which the fingerprint sensor 430 is located on the display 410 may be referred to as a "fingerprint sensor region". That is, the fingerprint sensor region is a region in which a fingerprint can be sensed out of a content display region of the display 410, and according to the embodiment, the fingerprint sensor region may include one sub-region in the content display region, a plurality of visibly separated sub-regions, or the entire region of the content display region.

Referring to FIG. 6B, the fingerprint sensor 430 may be installed over the entire panel of the display 410. That is, the fingerprint sensor 430 may be installed in a form in which a plurality of sensing elements are arranged. Accordingly, fingerprint recognition may be performed through the entire region of the display 410. Since the fingerprint sensor 430 is located in the entire region of the panel of the display 410 rather than the partial region thereof, a fingerprint can be input anywhere in a user's desired region of the panel of the display 410, thereby enhancing the user experience.

An electronic device according to an embodiment may include a display, a fingerprint sensor for acquiring fingerprint data through a "display region", where the "display region" is at least a partial region of an entire display area of the display, a memory for storing a first application for performing a designated function other than fingerprint registration and a second application for performing fingerprint registration, and a processor. Here, the processor may be configured to execute the first application, and an operation of executing the first application may include an operation of displaying a first graphical object for controlling a designated function through at least a partial region. Next, the processor may be configured to acquire at least one first fingerprint data (or a piece of fingerprint data) from a first user input on the first graphical object using the fingerprint sensor and may execute the second application. An operation of executing the second application may include an operation of acquiring second fingerprint data from a second user input on the display region. The processor may also be configured to generate fingerprint information about the same user using the at least one first fingerprint data and the second fingerprint data.

In addition, the processor may be configured to control the designated function in response to the first user input. In addition, the processor may be configured to display a second graphical object through the display region in response to the first user input. In addition, the processor may be configured to acquire the other fingerprint data from the second user input for the second graphical object using the fingerprint sensor. In addition, the fingerprint data may include first fingerprint data corresponding to a user's first finger and second fingerprint data corresponding to a user's second finger, and the processor may be configured to select a fingerprint data having a designated range of relevance to another fingerprint data among the first fingerprint data and the second fingerprint data, as at least a part of an operation of generating the fingerprint information. In addition, the processor may be configured to generate fingerprint data different from the selected fingerprint data as the fingerprint information for the user. In addition, the processor may be configured to select the first graphical object based on a priority among a plurality of objects. In addition, when the designated function is a first designated function, the processor may be configured to display a first object as the first graphical object. In addition, when the designated function is a second designated function, the processor may be configured to display a second object as the first graphical object.

In addition, the memory may include a first memory and a second memory having different security levels, and the processor may be configured to store the fingerprint data in the first memory as the at least a part of the operation of generating the fingerprint information. Next, the processor may be configured to store the fingerprint data and the other fingerprint data in the second memory as the at least a part of the operation of generating the fingerprint information. At this time, the processor may be configured to discard the fingerprint data stored in the first memory.

An electronic device according to another embodiment may include a display for displaying at least one object, a fingerprint sensor for acquiring fingerprint data through at least a partial region of a display region of the display, and a processer. Here, the processor may be configured to display an object for a first application in the at least a partial region, to acquire fingerprint data including at least one fingerprint image in response to a touch input for the object, and to register the fingerprint data and a reference fingerprint image acquired through a second application as fingerprint information.

In addition, the processor may control to display a notification informing acquisition of the fingerprint data through the first application. Further, the processor may activate the fingerprint sensor in response to occurrence of a touch input. In addition, the processor may control to acquire the at least one fingerprint image through a configuration application, and when the number of fingerprint images smaller than a threshold value are acquired through the configuration application, the processor may activate a fingerprint data collection function using a general application other than the configuration application. In addition, the processor may group the fingerprint data acquired through the first application into a plurality of groups based on a degree of similarity so as to classify the fingerprint data for each finger. At this time, the processor may allow at least one fingerprint image included in a group including the fingerprint image having more than a certain degree of similarity with the reference fingerprint image among the plurality of groups, to be included in the fingerprint information. In addition, the processor may control to display a screen requiring a fingerprint input in response to execution of the second application, and may determine the fingerprint image acquired through the screen as the reference fingerprint image.

Figure 7:
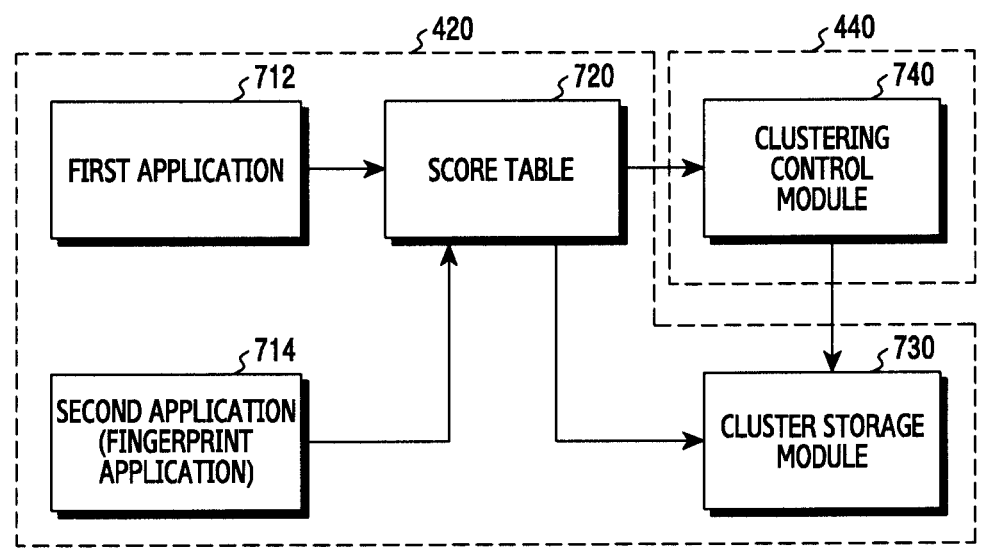
FIG. 7 illustrates an interlocking relationship between components of an electronic device according to various embodiments of the present disclosure.

FIG. 7 illustrates an interworking relationship between components of an electronic device, and a connection relationship between components for acquiring and registering a fingerprint, according to various embodiments of the present disclosure. As illustrated, the memory 420 may include a first application 712, a second application 714, a score table 720, and a cluster storage module 730. The processor 440 may include a clustering control module 740.

The first application 712 may be a general application designed for purposes other than fingerprint registration. Accordingly, the first application 712 may perform functions according to corresponding purposes and applications. In order to induce a touch input to occur in a fingerprint sensor region, the first application 712 may provide a function of displaying at least one object in the fingerprint sensor region and collecting fingerprint data. Then, the fingerprint data acquired by the first application 712 can be reflected in the score table 720. The first application 712 may be a set of at least two applications.

The second application 714 may be an application designed for fingerprint registration. The second application 714 may acquire fingerprint data, that is, at least one fingerprint image through a fingerprint registration procedure. To this end, the second application 714 may request fingerprint registration and may display an interface for instructing an input of a fingerprint. Then, the fingerprint data acquired by the second application 714 can be reflected in the score table 720.

The score table 720 may be information about a degree of similarity of the fingerprint data, that is, information about a measurement result on the degree of similarity between fingerprint images. The score table 720 may be generated by various algorithms. The cluster storage module 730 may include information about fingerprint images having more than a certain degree of similarity or a connection relationship of the fingerprint images based on the score table 720. That is, the cluster storage module 730 may include information about results obtained by classifying the fingerprint images based on the degree of similarity.

The clustering control module 740 may cluster the fingerprint images based on the degree of similarity. Specifically, the clustering control module 740 may discern the degree of similarity between the fingerprint images based on the score table 720, and may group the fingerprint images having a degree of similarity equal to or greater than a threshold value. The results of the grouping may be reflected in the cluster storage module 730.

According to various embodiments of the present disclosure, the electronic device 101 may acquire the fingerprint data through a general application other than a fingerprint registration application, and may store the acquired fingerprint data in a first storage space (e.g., memory, database, or the like). In order to naturally acquire a fingerprint while a user operates the electronic device 101, the electronic device 101 may display an object receiving a user touch input among contents to be corresponded to a position where the fingerprint sensor 430 is embedded in the display 410. Hereinafter, operational procedures of the electronic device 101 will be described in detail with reference to the drawings.

Figure 8:
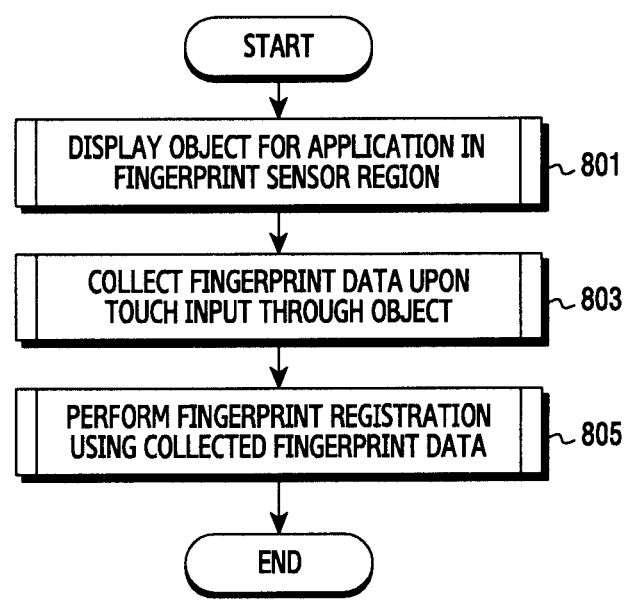
FIG. 8 is a flowchart illustrating a method of registering fingerprint(s) in an electronic device according to various embodiments of the present disclosure.

FIG. 8 is a flowchart illustrating a method of registering fingerprint in an electronic device according to various embodiments of the present disclosure. FIG. 8 illustrates a method of operating the electronic device 101.

Referring to FIG. 8, in operation 801, the electronic device 101 (e.g., the processor 440) may display an object for an application in a fingerprint sensor region. Here, the object may include a visually recognizable graphical object. In other words, the processor 440 may display at least one object (e.g., a button, etc.) constituting a screen of the application on the display 410, and the at least one object may be displayed in a region corresponding to the fingerprint sensor 430. Here, the application may be a general application designed for purposes other than fingerprint registration. The application may be configured through a plurality of screens, and may include an object corresponding to each screen.

Next, in operation 803, the electronic device 101 (e.g., the processor 440) may collect fingerprint images at the time of a touch input through the object. That is, the processor 440 may acquire fingerprint data, that is, at least one fingerprint image through the fingerprint sensor 430. Specifically, the processor 440 may acquire the fingerprint data from the at least one object, and may store the acquired fingerprint data in a first storage space. Here, the first storage space may be a region other than a storage space in which registered fingerprint information is stored. For example, the first storage space may be a part of the remainder of the memory 420 except for the security memory 422. As another example, the acquired fingerprint data may be stored in another space other than the storage space in which the registered fingerprint information is stored, within the security memory 422. In other words, the first storage space may be included in the security memory 422 and may be distinguished from a second storage space in which the registered fingerprint information is stored. At this time, when the object is selected, the screen may be switched. Accordingly, the fingerprint data may be collected repeatedly on a plurality of screens.

Next, in operation 805, the electronic device 101 (e.g., the processor 440) may perform fingerprint registration using the collected fingerprint images. The processor 440 may execute a fingerprint registration application and may acquire fingerprint data for fingerprint registration. At this time, the fingerprint data acquired through the fingerprint registration application may be used as a reference fingerprint image for fingerprint registration. Accordingly, the processor 440 may perform fingerprint registration using the fingerprint data corresponding to the reference fingerprint image and the collected fingerprint data having more than a certain degree of similarity with the reference fingerprint image. The registered fingerprint information may be stored in the second storage space. The second storage space is a region for storing the fingerprint information, and may be included in, for example, the security memory 422. That is, "storing the fingerprint information in the second storage space" may be used in the same meaning as "registering a fingerprint" or "registering the fingerprint information". Here, even though the first storage space for storing the acquired fingerprint data is included in the security memory 422, the first storage space and the second storage space may be designed to be physically or logically distinguishable from each other.

Specifically, in operation 805, the electronic device 101 may acquire the fingerprint data a plurality of times, may store the acquired fingerprint data in the first storage space as fingerprint candidates, may read the fingerprint candidate corresponding to the acquired fingerprint information from the first storage space when desiring to register a fingerprint through the fingerprint registration application, and then may store the read fingerprint candidate in the second storage space separate from the first storage space. According to an embodiment, the second storage space may be a dedicated storage space for storing fingerprint information for which fingerprint registration is completed.

If necessary, the electronic device 101 may further collect additional fingerprints. When the number of fingerprint images included in the collected fingerprint data is sufficient, the electronic device 101 may complete the fingerprint information together with the fingerprint data acquired through registration application, and may identify user's final confirmation and approval. However, when the collected fingerprint data is not sufficient, the electronic device 101 may adjust the number of fingerprint inputs based on the number of the collected fingerprint images. For example, an insufficient number of additional fingerprint inputs can be performed. Specifically, assuming that ten fingerprint inputs are required in a conventional fingerprint registration process without pre-collection, when seven fingerprint images matching a reference fingerprint obtained at the time of fingerprint registration are stored in the first storage space, the electronic device 101 may store, in the second storage space, the fingerprint image acquired at the time of fingerprint registration and the seven fingerprint images stored in the first storage space, and may perform a procedure for additionally acquiring two fingerprint images. When there is no pre-collection of the fingerprint data, a user should input fingerprints through the fingerprint registration application a total of ten times, but according to various embodiments of the disclosure, the user may input fingerprints through the same fingerprint registration application only three times, so that the fingerprint registration may be completed.

When the fingerprint is further input as described above, the electronic device 101 may request the fingerprint corresponding to a desired portion of the finger. Specifically, the electronic device 101 may determine a fingerprint region that is further required for the fingerprint data that has already been collected, and may display a guidance for a corresponding fingerprint region so that the fingerprint of the determined fingerprint region may be further input. Here, the guidance may be composed of a combination of graphics, images, characters, and the like.

As described with reference to FIG. 8, the electronic device 101 may collect the fingerprint data in advance using a general application, and may simplify the fingerprint registration process using the collected fingerprint data. For the collection of the fingerprint data, various applications can be utilized. For example, applications that use at least one object, such as a configuration application (e.g., a configuration application of out-of-box experience (OOBE)) executed at the time of initial booting, a camera application, a recording application, etc. Hereinafter, a procedure of collecting fingerprint data will be described together with a specific example of the application.

Figure 9A:
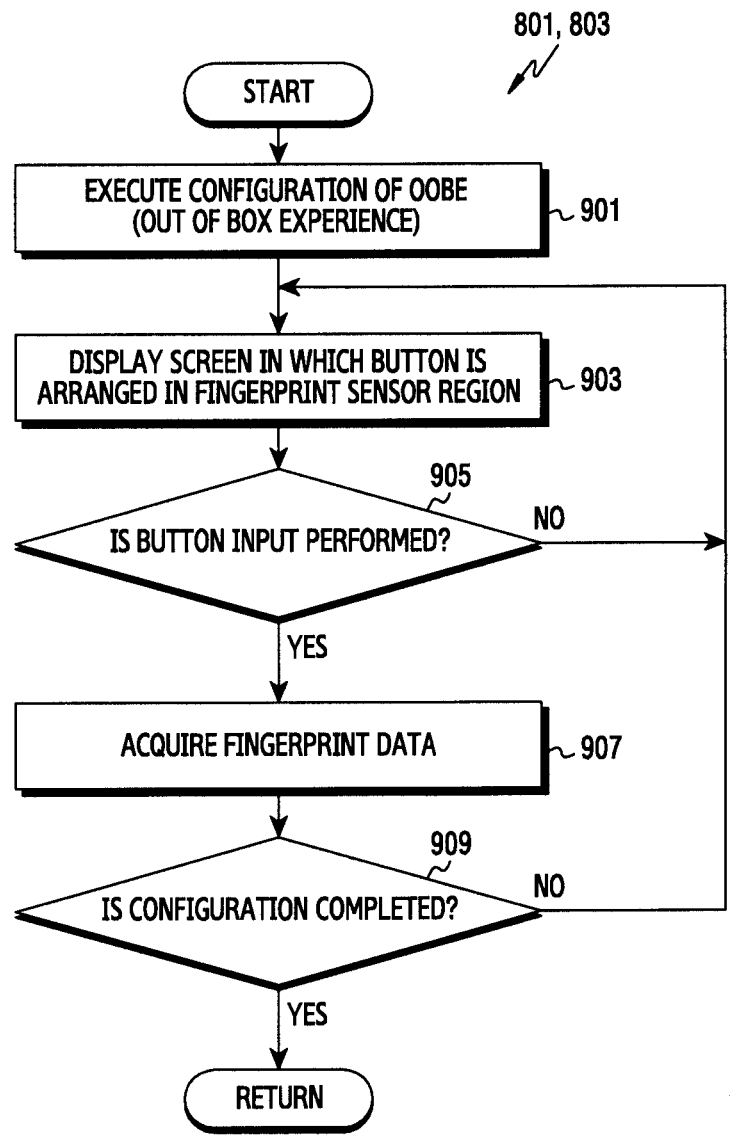
FIG. 9A is a flowchart illustrating a method of acquiring fingerprint data during a configuration procedure in an electronic device according to various embodiments of the present disclosure.

FIG. 9A is a flowchart illustrating a method of acquiring fingerprint data during a configuration procedure in an electronic device according to various embodiments of the present disclosure. FIG. 9A illustrates an operation method of collecting fingerprint data through the configuration application of OOBE.

Referring to FIG. 9A, in operation 901, the electronic device 101 (e.g., the processor 440) may execute the configure application of OOBE. The OOBE may be an environment that is initially executed after a product is purchased, that is, an environment that is executed at the time of initial booting. At this time, the processor 440 may perform a configuration procedure for various variables such as an interface of the electronic device 101, activation of functions, etc., and may request a user's selection of some variables. The configuration application of OOBE may be performed by the user initially powering on the electronic device 101.

Next, in operation 903, the electronic device 101 (e.g., the processor 440) may display a screen in which the at least one object (e.g., a button) is arranged in the fingerprint sensor region. For convenience of explanation, according to the embodiment of FIG. 9A, a button configured to perform a specific function will be described as example of the object. For example, the button may be a button for screen switching. In other words, according to an embodiment, in an environment configuration procedure of OOBE which is an environment that is initially used after a product is purchased, the processor 440 may display a screen in which elements (e.g., a start button, a next button, a back button, a cancellation button, a later button, a setting button, a finishing button, etc.) of a screen for detecting a user's input to perform each operation of the configuration procedure are arranged in a region corresponding to the fingerprint sensor 430. Operation 903 may be repeatedly performed according to the determination in operation 909 below.

Next, in operation 905, the electronic device 101 (e.g., the processor 440) may determine whether a corresponding button is input. The input of the button may be determined by detection of a touch input. That is, the processor 440 may determine whether a user's touch input for the button arranged in the fingerprint sensor region occurs. When the button is not input, the electronic device 101 may return to operation 903 and may display the corresponding screen.

In operation 907, when the button is input, the electronic device 101 (e.g., the processor 440) may acquire fingerprint data. In other words, the processor 440 may acquire the fingerprint data by sensing a corresponding fingerprint through the fingerprint sensor 430. At this time, in each operation of the configuration procedure, when the fingerprint data is successfully acquired, the processor 440 may provide a feedback (e.g., haptic, sound, etc.) that a user can perceive.

Next, in operation 909, the electronic device 101 (e.g., the processor 440) may determine whether the configuration procedure is terminated. The configuration procedure may be terminated by a user's command for termination, completion of the configuration procedure, and the like. That is, the processor 440 may discern whether the button input in operation 905 is the finishing button or a button for moving to the next screen. When the configuration procedure is not terminated, the processor 440 may return to operation 903.

Figure 9B:
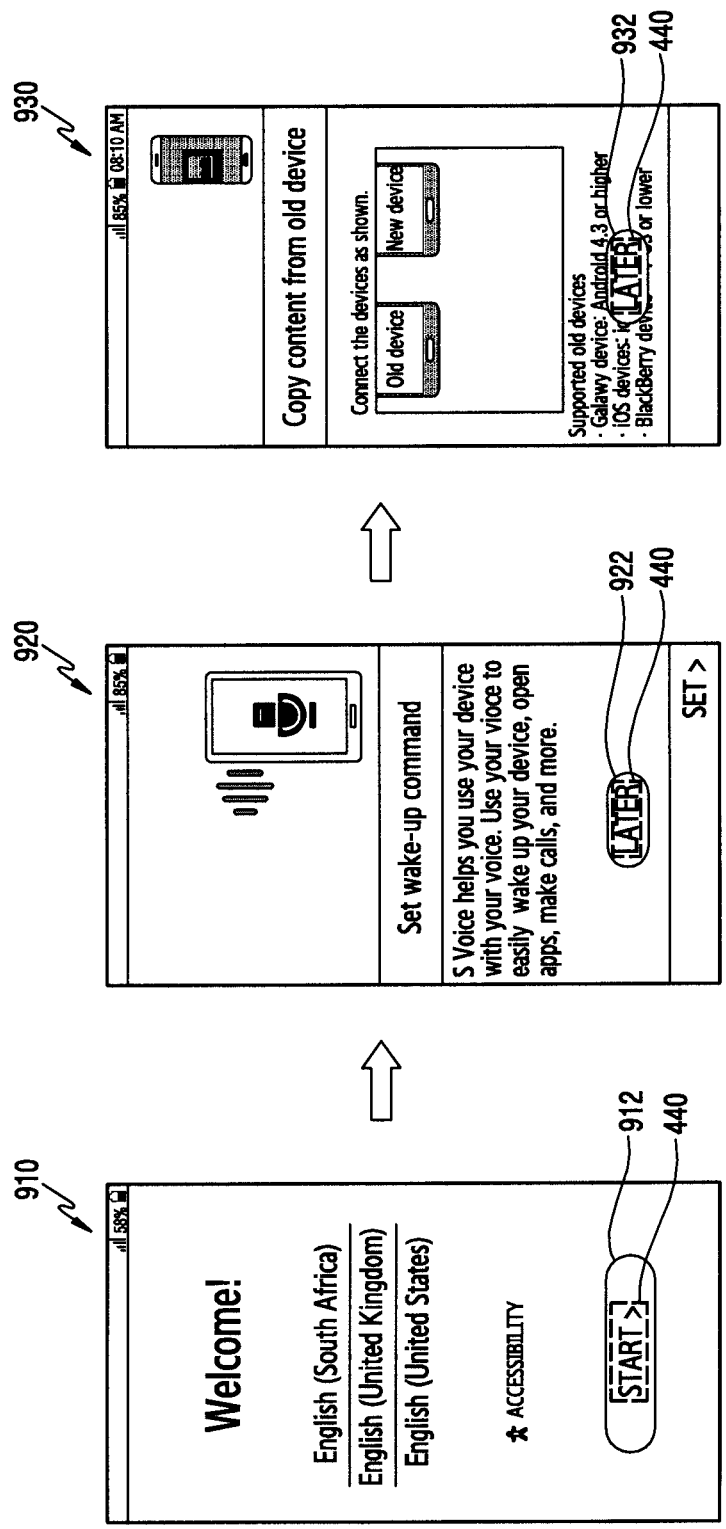
FIG. 9B illustrates examples of a user interface for acquiring fingerprint data during a configuration procedure in an electronic device according to various embodiments of the present disclosure.

Accordingly, in operation 903, the electronic device 101 (e.g., the processor 440) may display another screen for the configuration procedure in response to the user's input and may display an interface element, such as a button, in the fingerprint sensor region. For example, screens 910, 920, and 930 as shown in FIG. 9B may be displayed. FIG. 9B illustrates a change in the screen according to the user's button input. Referring to FIG. 9B, a first screen 910 may include a start button 912 and the start button 912 may be arranged in a region corresponding to the fingerprint sensor 430. When the start button 912 is input, a second screen 920 including a later button 922 may be displayed. At this time, the later button 922 may be arranged in the region corresponding to the fingerprint sensor 430. In the second screen 920, when the later button 922 is input, a third screen 930 including a later button 932 may be displayed. At this time, the later button 932 may be arranged in the region corresponding to the fingerprint sensor 430.

Figure 9C:
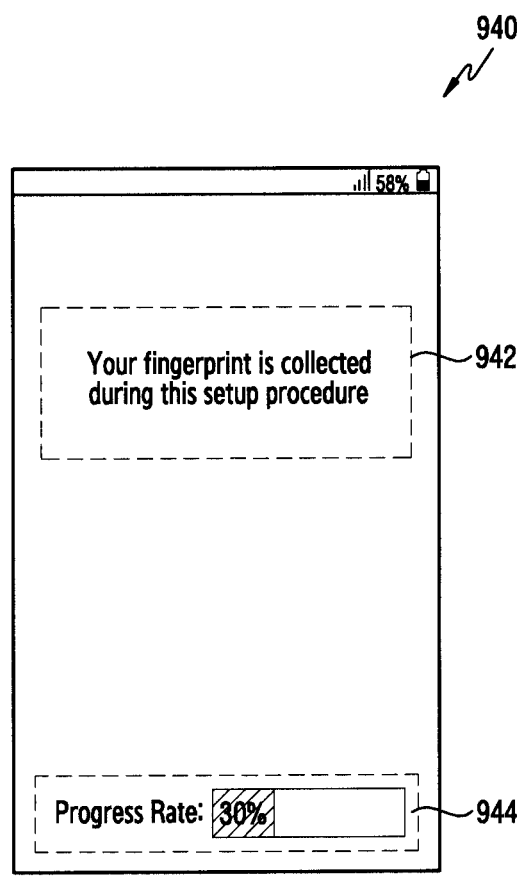
FIG. 9C illustrates other examples of a user interface used to acquire fingerprint data during a configuration procedure in an electronic device according to various embodiments of the present disclosure.

In addition to the procedure described with reference to FIG. 9A, the electronic device 101 may output a guidance for fingerprint collection. According to an embodiment, in the configuration operation of OOBE, which is the environment that is initially used after the product is purchased, when a user touches the screen elements for which the user's input is discerned to perform each operation, for example, a start button, a next button, a back button, a cancellation button, a later button, a setting button, a finishing button, etc., the electronic device 101 may provide a guide screen indicating that the fact that the fingerprint sensor collects the user's fingerprints while operating in the background and the purpose of collecting the fingerprints are to minimize the fingerprint input procedure in the fingerprint input operation, so that it is possible to display, on the screen, a guidance indicating that the user's fingerprint are collected as a background operation while each operation is performed without a separate screen element for separate fingerprint acquisition. For example, as shown in FIG. 9C, the electronic device 101 may display a fourth screen 940 including a guiding text 942. Furthermore, the electronic device 101 may visually display a progress of the acquired fingerprint (e.g., % for target achievement, etc.) so that a progress of collection of the fingerprint data may be discerned. For example, as shown in FIG. 9C, the electronic device 101 may display the fourth screen 940 including a progress indicator 944.

As described with reference to FIG. 9A, FIG. 9B, and FIG. 9C, when the user touches a button for moving to a next operation or a previous operation on the screens for the respective operations of the configuration procedure, the electronic device 101 may collect the fingerprint data of the user by the fingerprint sensor operating in a corresponding location region, and may store the collected fingerprint data in a separate storage space. At this time, the electronic device 101 may group the acquired fingerprint data based on a degree of similarity, may store the grouped fingerprint data, and may discern a finger type corresponding to each fingerprint through mapping of fingerprint information input for future fingerprint registration and a previously registered fingerprint group.

Prior to the fingerprint registration process, the fingerprint data acquired during the configuration procedure may be used in the fingerprint registration process. For the purpose of fingerprint registration, the electronic device 101 may replace an operation of performing about 10 to 20 fingerprint inputs per finger with the previously collected fingerprint data. Initial fingerprint information input for registration at the time of fingerprint registration becomes a reference fingerprint image. The electronic device 101 may compare the reference fingerprint image with the previously acquired fingerprint data, and may utilize a fingerprint group matching the input reference fingerprint image as fingerprint information to be registered by the user. This method may provide effects of greatly reducing the number of fingerprint inputs and operations in the fingerprint registration process. In particular, since the configuration procedure of OOBE is a procedure that is necessarily performed when the electronic device 101 is initially used, the configuration procedure may be suitable for utilization for collection of the fingerprint data.

An application executed in the use environment of the general electronic device 101 can be utilized for collecting the fingerprint data. At this time, in order to effectively collect the fingerprint data, by matching the interface element defined for a main function of a corresponding application with the position of the fingerprint sensor 430, the electronic device 101 may acquire user's fingerprint data from the fingerprint sensor 430 when the user inputs a touch to execute the main function of the corresponding application.

When the user touches the button defined for the main function of the application, the electronic device 101 may acquire the user's fingerprint data, may map the acquired fingerprint data with a previously collected fingerprint group, and then may store the fingerprint data. The collected fingerprint data may be utilized to enhance the accuracy of an existing fingerprint group. Alternatively, upon acquiring new fingerprint data that is not mapped with the previously stored fingerprint group, the collected fingerprint data may be used to generate a fingerprint group of a new finger.

Figure 10A:
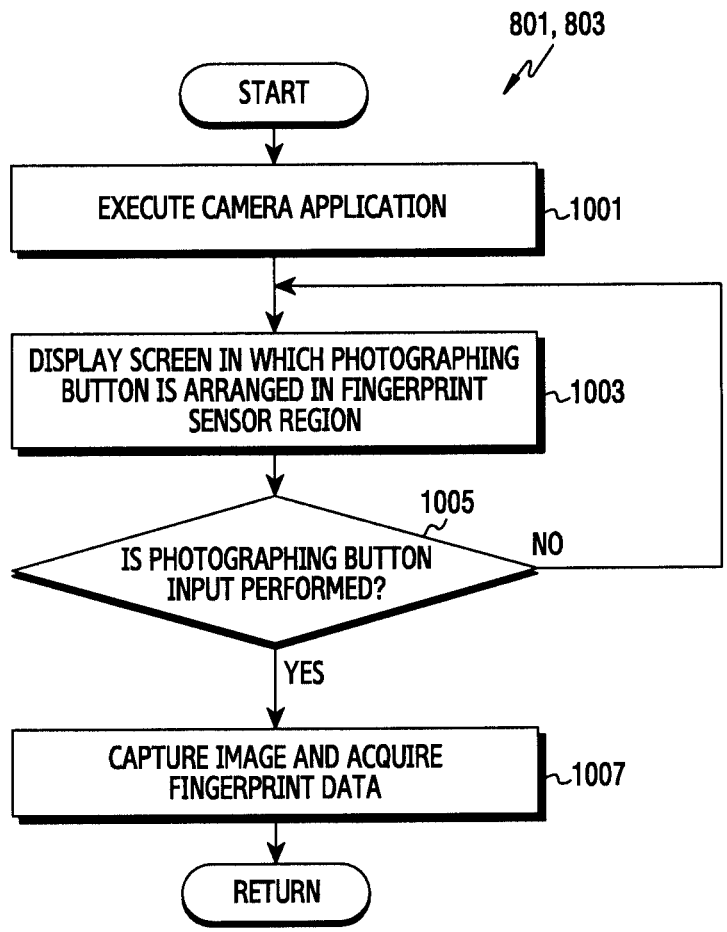
FIG. 10A is a flowchart illustrating a method of acquiring fingerprint data using a camera application in an electronic device according to various embodiments of the present disclosure.

FIG. 10A is a flowchart illustrating a method of acquiring fingerprint data using a camera application in an electronic device according to various embodiments of the present disclosure. FIG. 10A illustrates an operation method of collecting fingerprint data through a camera application.

Referring to FIG. 10A, in operation 1001, the electronic device 101 (e.g., the processor 440) may execute the camera application. The camera application may be executed by a user's command. That is, the processor 440 may detect the user's command (e.g., icon selection) for the execution of the camera application, and may execute the camera application.

Figure 10B:
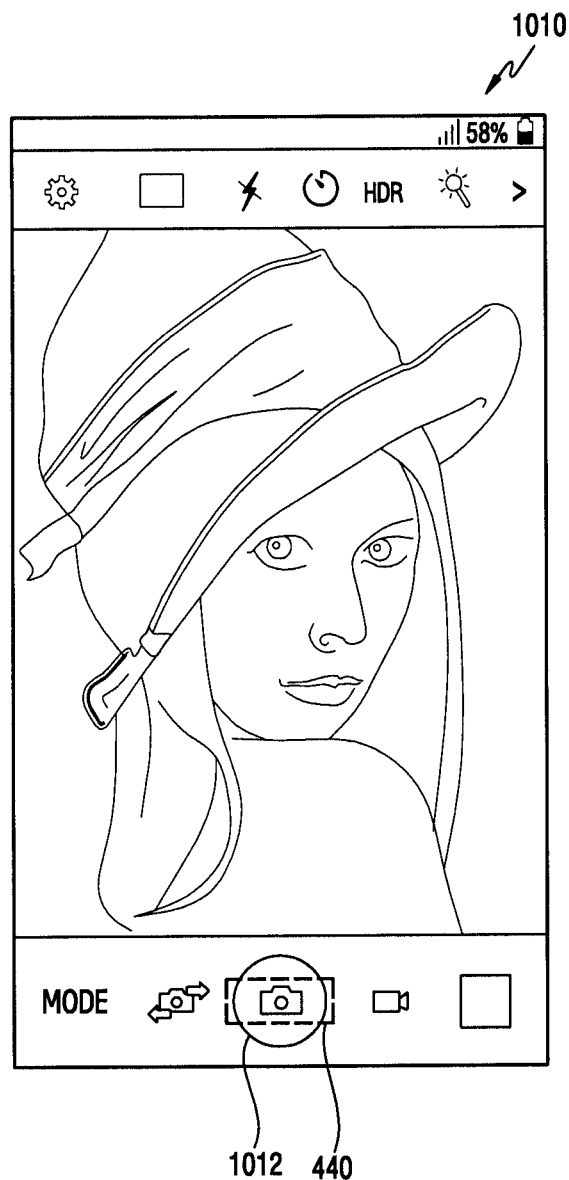
FIG. 10B illustrates an example of a user interface for acquiring fingerprint data using a camera application in an electronic device according to various embodiments of the present disclosure.

Next, in operation 1003, the electronic device 101 (e.g., the processor 440) may display a screen in which a photographing button is arranged in a fingerprint sensor region. Here, the photographing button is an interface element used for executing a main function of the camera application, and may be an object for which frequent touch inputs are expected. For example, as shown in FIG. 10B, the processor 440 may display a screen 1010 including a photographing button 1012 through the display 410, and the photographing button 1012 may be arranged in a region corresponding to the fingerprint sensor 430.

Next, in operation 1005, the electronic device 101 (e.g., the processor 440) may determine whether the photographing button is input. The input of the button may be determined by detection of the touch input. That is, the processor 440 may determine whether a user's touch input for the photographing button arranged in the fingerprint sensor region occurs. When the photographing button is not input, the electronic device 101 may return to operation 1003 and may display a corresponding screen.

In operation 1007, when the photographing button is input, the electronic device 101 (e.g., the processor 440) may capture an image and may acquire fingerprint data. In other words, the processor 440 may acquire the fingerprint data by sensing a corresponding fingerprint through the fingerprint sensor 430. At this time, when the fingerprint data is successfully acquired, the processor 440 may provide a feedback (e.g., haptic, sound, etc.) that a user can perceive.

Figure 11A:
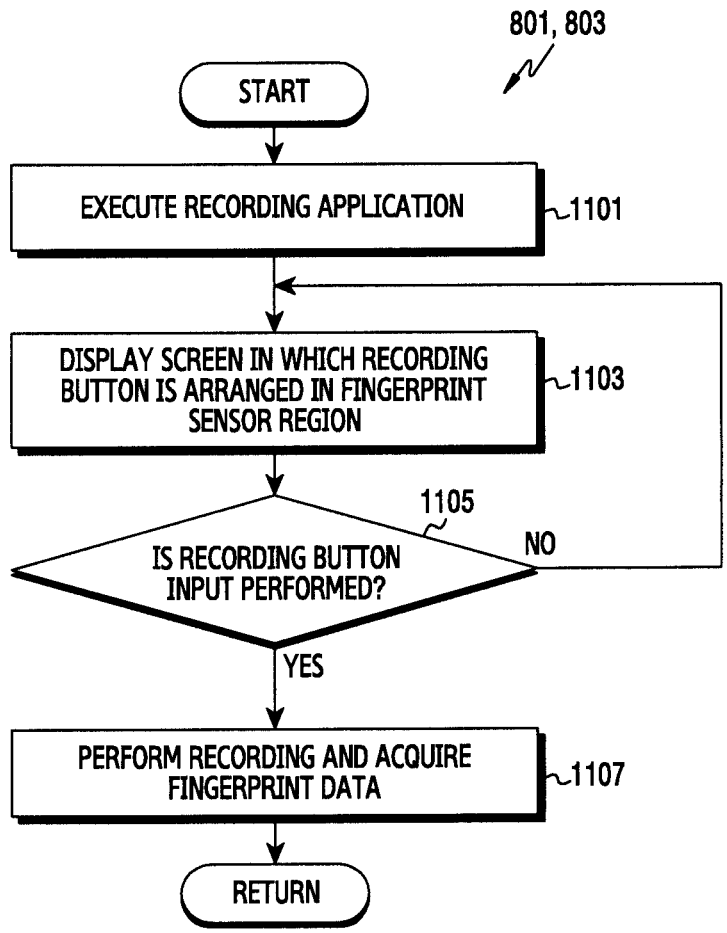
FIG. 11A is a flowchart illustrating a method of acquiring fingerprint data using a recording application in an electronic device according to various embodiments of the present disclosure.

FIG. 11A is a flowchart illustrating a method of acquiring fingerprint data using a recording application in an electronic device according to various embodiments of the present disclosure. FIG. 11A illustrates an operation method of collecting fingerprint data through a recording application.

Referring to FIG. 11A, in operation 1101, the electronic device 101 (e.g., the processor 440) may execute a recording application. The recording application may be executed by a user's command. That is, the processor 440 may sense the user's command (e.g., icon selection) for the execution of the recording application and may execute the recording application.

Figure 11B:
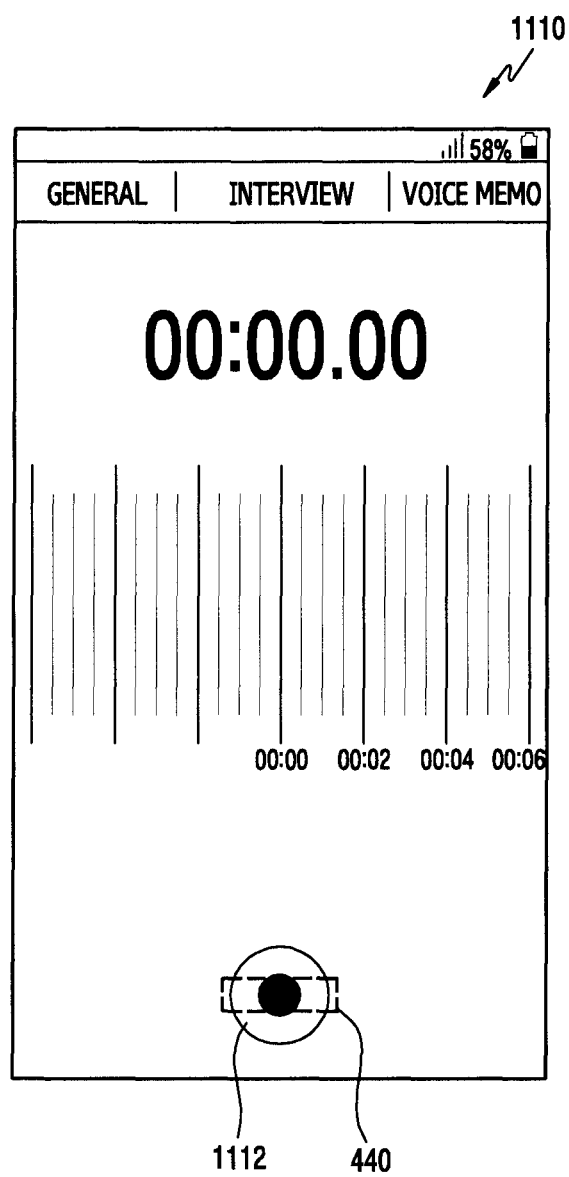
FIG. 11B illustrates an example of a user interface for acquiring fingerprint data using a recording application in an electronic device according to various embodiments of the present disclosure.

Next, in operation 1103, the electronic device 101 (e.g., the processor 440) may display a screen in which a recording button is arranged in a fingerprint sensor region. Here, the recording button is an interface element used to perform a main function of the recording application, and may be an object in which frequent touch inputs are expected. For example, as shown in FIG. 11B, the processor 440 may display a screen 1110 including a recording button 1112 through the display 410, and the recording button 1112 may be arranged in a region corresponding to the fingerprint sensor 430.

Next, in operation 1105, the electronic device 101 (e.g., the processor 440) may determine whether the recording button is input. The input of the button may be determined by detection of a touch input. That is, the processor 440 may determine whether a user's touch input for the recording button arranged in the fingerprint sensor region occurs. When the recording button is not input, the electronic device 101 may return to operation 1103 and may display a corresponding screen.

In operation 1107, when the recording button is input, the electronic device 101 (e.g., the processor 440) may perform recording and may acquire fingerprint data. In other words, the processor 440 may acquire the fingerprint data by sensing a corresponding fingerprint through the fingerprint sensor 430. At this time, when the fingerprint data is successfully acquired, the processor 440 may provide a feedback (e.g., haptic, sound, etc.) that a user can perceive.

As described with reference to FIG. 9A, FIG. 9B, FIG. 9C, FIG. 10A, FIG. 10B, FIG. 11A, and FIG. 11B, the electronic device 101 may collect the fingerprint data by properly arranging at least one object for the corresponding application. The above-described embodiments relate to the configuration application of OOBE, the camera application, and the recording application, but a similar procedure may be performed through other applications.

To this end, at the time of designing the application, the position of the object may have to be determined in consideration of the position of the fingerprint sensor 430. However, even if the application is designed by a third party, various embodiments of the present disclosure can be applied as long as the position of the interface element is controllable by a platform of an operating system. According to an embodiment, in a framework level of the platform, an application programming interface (API) capable of determining attribute information of the interface element (e.g., object) based on attribute information (e.g., position, size, density, or type) of a biometric sensor (e.g., the fingerprint sensor 430) provided in the electronic device 101 may be provided. For example, at the time of calling an API that displays an object (e.g., a button) associated with user authentication (e.g., fingerprint authentication), a framework terminal may notify the attribute information of the biometric sensor provided in the electronic device 101, and the processor may change a shape or a color of the object associated with user authentication based on the attribute information of the biometric sensor, thereby displaying the object at a position corresponding to the biometric sensor.

When the arrangement of the interface element, that is, the objects are dynamically changeable, the objects may be arranged in a corresponding priority. That is, each of the objects may have a priority that can be located in the fingerprint sensor region. The priority may be determined based on the size of the object, importance, interworking with the context of the previous operation, and the like. In this case, the electronic device 101 may determine the object to be arranged in the fingerprint sensor region in consideration of the priority of the object, and may arrange the objects in the fingerprint sensor region.

According to an embodiment, when the arrangement of the objects is dynamically changeable, the objects may be adaptively arranged according to the identity of the fingerprint images. For example, when the fingerprint images for the same portion of the finger are successively acquired, the electronic device 101 may induce acquisition of a fingerprint image of another portion of the finger by changing the position of the object on a next screen.

According to an embodiment, the fingerprint data is illustrated as being collected when the corresponding button is tapped or pressed such as by a touch input, but the fingerprint data may be collected even at the time of another type of touch input. For example, when a touch in the form of swiping is input, the fingerprint data may be collected. To this end, the fingerprint sensor 430 may be installed at least one point on a movement path of a touch point for swiping.

According to an embodiment, the fingerprint data may be collected using an execution icon of an application in addition to the elements of the application such as buttons. In this case, the electronic device 101 may induce a touch input for the fingerprint sensor 430 by moving the execution icon of the application having a relatively high execution frequency to the fingerprint sensor region.

In addition, in the above-described embodiments, in order to collect the fingerprint data before the fingerprint registration procedure, the fingerprint sensor 430 may operate during execution of a general application. At this time, in order to reduce power consumption by the fingerprint sensor 430, the operation state of the fingerprint sensor 430 may be adaptively controlled. Hereinafter, the control of the fingerprint sensor 430 will be described with reference to FIG. 12.

Figure 12:
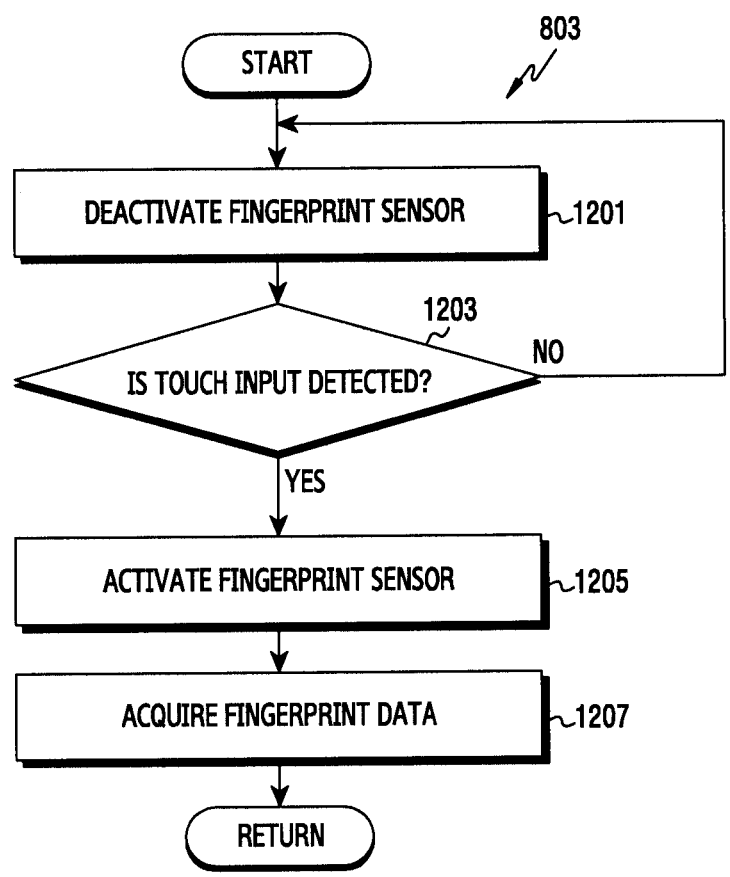
FIG. 12 is a flowchart illustrating a method of controlling a fingerprint sensor in an electronic device according to various embodiments of the present disclosure.

FIG. 12 is a flowchart illustrating a method of controlling a fingerprint sensor in an electronic device according to various embodiments of the present disclosure. FIG. 12 illustrates a method of operating the electronic device 101. FIG. 12 shows an operation of acquiring fingerprint data in a state in which an object is displayed, in detail.

Referring to FIG. 12, in operation 1201, the electronic device 101 (e.g., the processor 440) may deactivate the fingerprint sensor 430. That is, the processor 440 may deactivate the fingerprint sensor 430 when displaying an object in a fingerprint sensor region. Furthermore, the fingerprint sensor 430 may maintain an inactive state from before the display of the object. Here, inactivity may be a state in which the fingerprint sensor 430 does not perform a sensing operation. Thus, the inactive state may be variously defined according to a specific embodiment. For example, inactivity may be defined as a state in which a power supply to the fingerprint sensor 430 is interrupted, a state in which power is supplied but is disabled, a state in which only some functions of the fingerprint sensor 430 are interrupted, and the like.

Next, in operation 1203, the electronic device 101 (e.g., the processor 440) may determine whether a touch input is detected. In other words, the processor 440 may determine whether a user's touch input for the object arranged in the fingerprint sensor region occurs. When no touch input occurs, the electronic device 101 may return to operation 1201 to keep the fingerprint sensor 430 inactive.

On the other hand, in operation 1205, when the touch input occurs, the electronic device 101 (e.g., the processor 440) may activate the fingerprint sensor 430. That is, the processor 440 may control the fingerprint sensor 430 in a state in which sensing is possible. Accordingly, the fingerprint sensor 430 may perform a sensing operation and may provide a sensing result to the processor 440.

Next, in operation 1207, the electronic device 101 (e.g., the processor 440) may acquire fingerprint data. That is, the processor 440 may receive a measurement value associated with a fingerprint sensed by the activated fingerprint sensor 430 or information determined from the measurement value, and may generate fingerprint data based on the measurement value or the information. At this time, as described above, a similarity measurement operation and a grouping operation may be further performed.

In the procedure of FIG. 12, the electronic device 101 (e.g., the processor 440) may control the fingerprint sensor 430 according to whether a touch input occurs. Thus, according to another embodiment, the electronic device 101 may further determine the type of the touch input in addition to the occurrence of the touch input. Since the activation of the fingerprint sensor 430 is to acquire the fingerprint data, the activation is unnecessary when a means of the touch input is not a finger. Accordingly, the electronic device 101 may determine the type of the touch, and may activate the fingerprint sensor 430 when it is determined that the means of the touch input is a finger. At this time, the type of the touch may be determined based on a range of the touch input, intensity of a pressure, distribution of the pressure, and the like.

In addition, in the procedure of FIG. 12, the fingerprint sensor 430 may be activated by the touch input. At this time, as shown in FIG. 6B, when the fingerprint sensor 430 is installed over a large region of the display 410 rather than a specific region, only a part of the fingerprint sensor 430 installed at a position where the touch input occurs may be activated. To this end, the electronic device 101 may discern the position where the touch input occurs and may locally activate a portion of the fingerprint sensor 430 for an object (e.g., a button, etc.) region corresponding to the discerned position. Next, the electronic device 101 may acquire the fingerprint data only for an input for the corresponding region.

In addition, in the procedure of FIG. 12, the fingerprint sensor 430 may be activated in response to a touch input. However, according to another embodiment, the fingerprint sensor 430 may be activated when a possibility of a touch input is determined. For example, when a touch input occurs within a certain range of the fingerprint sensor region, or when proximity of an object is detected, the processor 440 may activate the fingerprint sensor 430. As shown in FIG. 6B, when the fingerprint sensor 430 is installed over a large region of the display 410 rather than in a specific region, the processor 440 may activate a part of the fingerprint sensor 430 in a region where the possibility of the touch input is relatively high (for example, a portion favorable to fingerprint acquisition or a portion where an object to be necessarily selected for screen configuration), or may increase the sensitivity. Furthermore, when a plurality of objects is displayed, the processor 440 may control a hardware control element (e.g., sensing time, touch sensitivity, sensor sensitivity, etc.) of the fingerprint sensor 430 in consideration of a priority of each object.

As described with reference to FIG. 12, the fingerprint sensor 430 may be deactivated at normal times and may be activated when a corresponding application is executed and loaded on the memory, the fingerprint sensor 430 may be switched to a state in which sensing can be performed. Accordingly, an unnecessary activation time of the fingerprint sensor 430 may be reduced, and the power consumption may also be reduced.

As described above, the fingerprint data may be collected through a general application. That is, according to various embodiments, by utilizing a screen configuration element (e.g., a start button, a next button, a cancellation button, a completion button, etc.) originally possessed by the general application without configuring a separate dedicated screen for a fingerprint input, the electronic device 101 may activate the fingerprint sensor 430 when a user's touch input occurs, and then may sense and acquire user's fingerprint data through the fingerprint sensor 430. The fingerprint data acquired in this manner may be stored in a separate storage space and may be managed until utilization thereof. In this case, separate screen configuration for acquiring the fingerprint data may not be required.

In collecting the fingerprint data using the general application, two or more applications may be used together. In addition, a function of collecting the fingerprint data through the general application may be adaptively controlled. An embodiment in which the function of collecting the fingerprint data through the general application is controlled will be described below with reference to FIG. 13.

Figure 13:
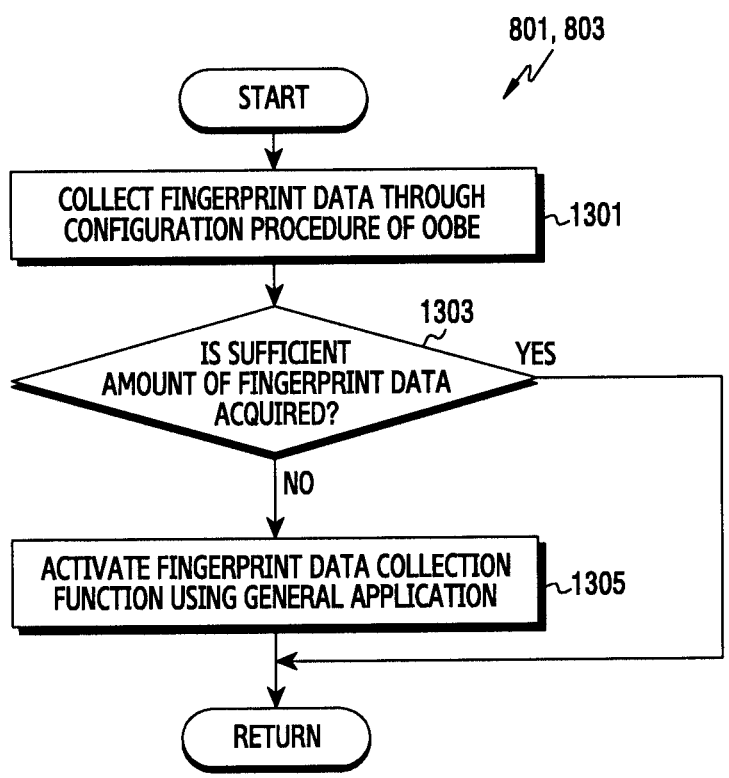
FIG. 13 is a flowchart illustrating a method of acquiring fingerprint data using a plurality of applications in an electronic device according to various embodiments of the present disclosure.

FIG. 13 is a flowchart illustrating a method of acquiring fingerprint data using a plurality of applications in an electronic device according to various embodiments of the present disclosure. FIG. 13 illustrates a method of operating the electronic device 101.

Referring to FIG. 13, in operation 1301, the electronic device 101 (e.g., the processor 440) may collect fingerprint data through a configuration procedure of OOBE. That is, in accordance with the initial power-on of the electronic device 101, the processor 440 may execute a configuration application and may arrange buttons in the fingerprint sensor region on screens for the configuration procedure, so that a touch input for the fingerprint sensor 430 may be induced. Through this, the processor 440 may obtain at least one fingerprint image. For example, the electronic device 101 may collect the fingerprint data through the procedure shown in FIG. 9A.

Next, in operation 1303, the electronic device 101 (e.g., the processor 440) may determine whether a sufficient amount of fingerprint data is acquired. After the configuration procedure of OOBE is completed, the processor 440 may determine whether the fingerprint data stored in the memory 420 satisfies a predefined condition. Here, whether the sufficient amount of fingerprint data is acquired may be determined based on the number of fingerprint inputs that are additionally required at the time of fingerprint registration. In other words, whether the sufficient amount of fingerprint data is acquired may be determined based on the number of fingerprint images included in the collected fingerprint data. That is, the processor 440 may compare the number of collected fingerprint images with a predefined threshold.

In operation 1305, when the sufficient amount of fingerprint data is not acquired, the electronic device 101 (e.g., the processor 440) may activate the function of collecting the fingerprint data using the general application. In other words, when the sufficient amount of fingerprint data is collected during the configuration procedure, it is unnecessary to further collect the fingerprint data through the general application. Thus, when the sufficient amount of fingerprint data is not collected during the configuration procedure, the processor 440 may collect the fingerprint data using the general application. That is, the collection of the fingerprint data using the general application other than the configuration procedure of OOBE may be performed under a condition that the sufficient amount of fingerprint data is not collected during the configuration procedure of OOBE.

Figure 14A:
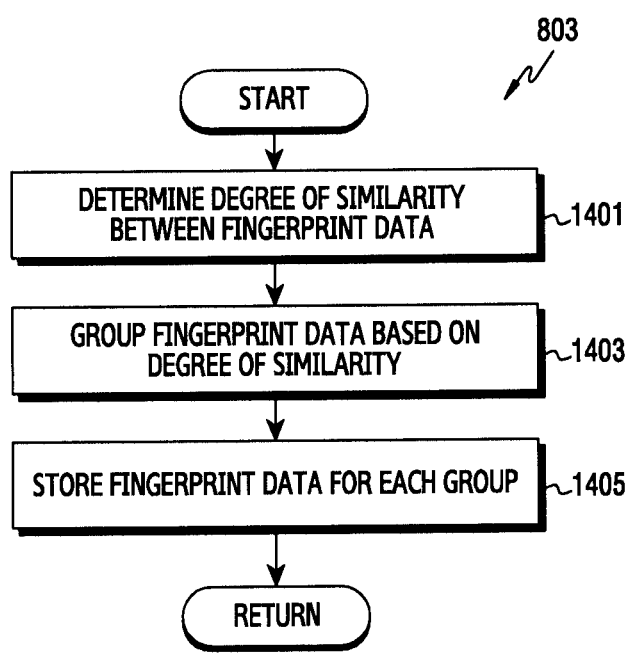
FIG. 14A is a flowchart illustrating a method of grouping fingerprint data in an electronic device according to various embodiments of the present disclosure.
Figure 14B:
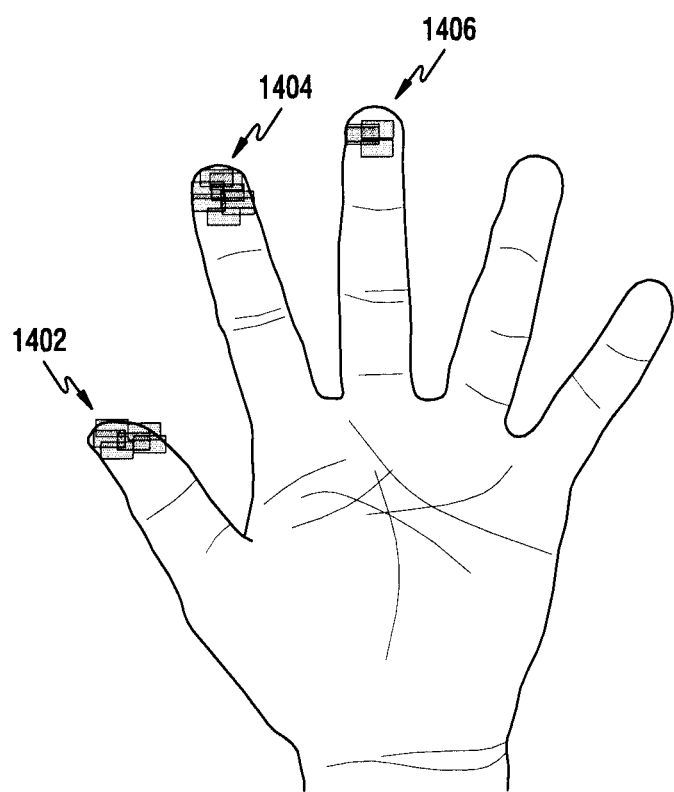
FIG. 14B illustrates a ranges along fingertip surfaces of corresponding fingerprint data acquired in an electronic device according to various embodiments of the present disclosure.

According to the various embodiments described above, the fingerprint data may be collected. The collected fingerprint data may be grouped and then may be used for fingerprint registration. Grouping, that is, clustering is an operation of classifying the fingerprint data for each finger, and may be performed based on a degree of similarity between the fingerprint data, that is, a degree of similarity between the fingerprint images. Hereinafter, embodiments for grouping the fingerprint data will be described, FIG. 14A is a flowchart illustrating a method of grouping fingerprint data in an electronic device according to various embodiments of the present disclosure. The method is an example of operating the electronic device 101. In operation 1401, the electronic device 101 (e.g., the clustering control module 740) may determine the degree of similarity between the fingerprint images. At this time, the degree of similarity may be measured for the entire fingerprint images, and furthermore, may be measured for some of the fingerprint images. That is, in a case in which the fingerprint images are all the same and in a case in which the fingerprint images are partially coincident with several fingerprint images previously stored in a partial region, it can be seen as a fingerprint extracted from the same finger. For example, as shown in FIG. 14B, a plurality of fingerprint images for a thumb 1402 may be acquired, and the fingerprint images may partially overlap each other. Also, a large number of fingerprint images for an index finger 1404 and a middle finger 1406 may also partially overlap each other. Accordingly, the processor 440 may repeatedly perform similarity determination for each partial region of the fingerprint images. By a similarity determination operation such as operation 1401, the score table 720 may be generated. That is, the processor 440 (e.g., the clustering control module 740) may score the degree of similarity using values of a predetermined range, and may tabulate the scored information. For example, as shown in FIG. 14C, the processor 440 may tabulate similarity values between the fingerprint images.

Figure 14D:
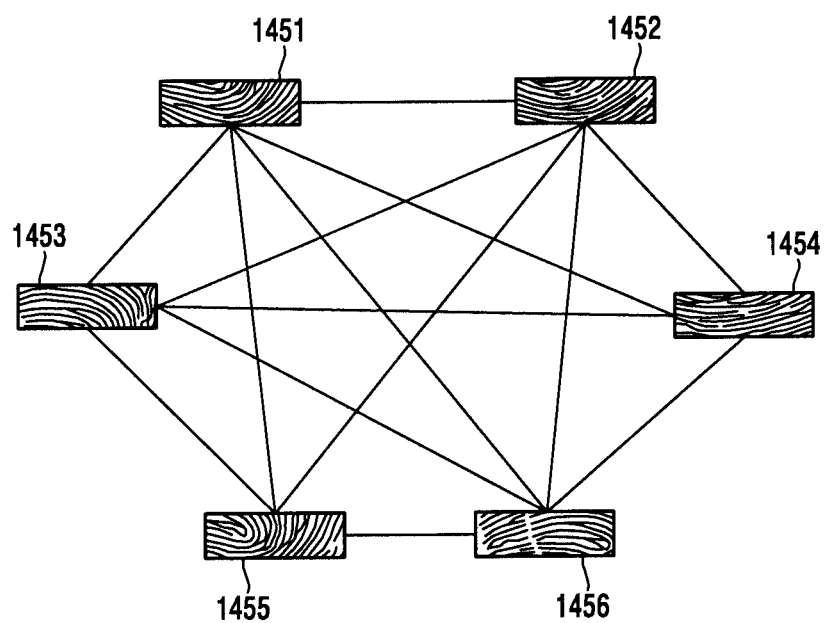
FIG. 14D illustrates an example of a similarity relationship of fingerprint data acquired in an electronic device according to various embodiments of the present disclosure.
Figure 14E:
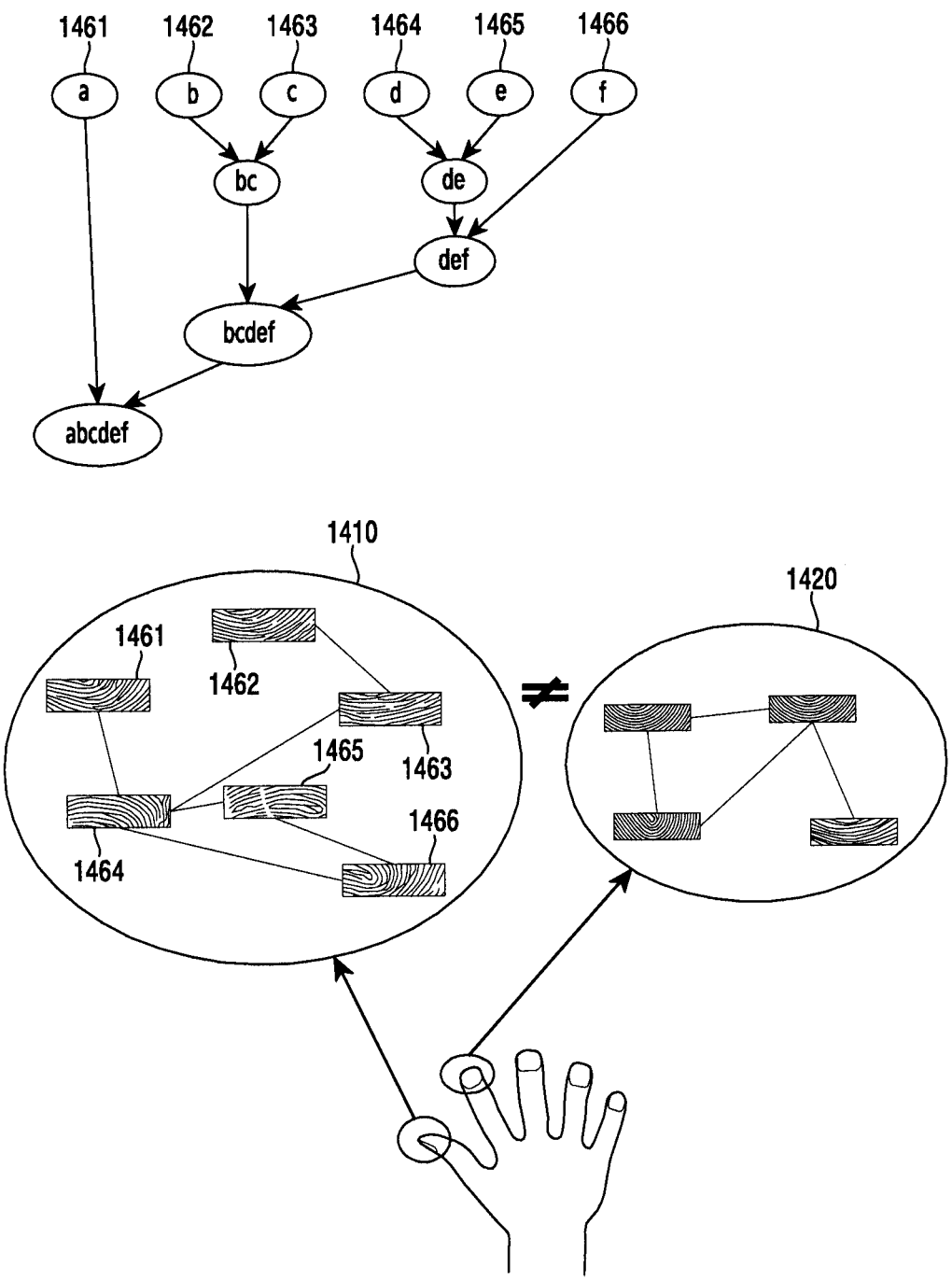
FIG. 14E illustrates an example of a grouping result of fingerprint data acquired in an electronic device according to various embodiments of the present disclosure.

Next, in operation 1403, the electronic device 101 (e.g., the clustering control module 740) may group the fingerprint images based on the degree of similarity. Specifically, the processor 440 (e.g., the clustering control module 740) may classify the fingerprint images having a degree of similarity equal to or greater than a threshold value into one group, based on the similarity values for all pairs of the fingerprint images. In other words, the processor 440 (e.g., the clustering control module 740) may group the fingerprint images so that a minimum degree of similarity in the group is equal to or greater than the threshold value. For example, as shown in FIG. 14C, the processor 440 may compare the tabulated similarity values. Accordingly, a group as shown in FIG. 14D, that is, a cluster, may be determined. Referring to FIG. 14D, fingerprint images 1451 to 1456 may be determined as one group. That is, it may be determined that the fingerprint images 1451 to 1456 are generated from the same finger. In the case of FIG. 14D, all pairs of the fingerprint images 1451 to 1456 within the group are illustrated as having the degree of similarity equal to or greater than the threshold value. However, it is unnecessary that all pairs of the fingerprint images 1451 to 1456 within the group should have the degree of similarity equal to or greater than the threshold value. For example, as shown in FIG. 14E, when the fingerprint images 1461 to 1466 exist, a fingerprint image b 1462 and a fingerprint image c 1463 have the degree of similarity equal to or greater than the threshold value, and a fingerprint image a 1461 has the degree of similarity equal to or greater than the threshold value with one of the fingerprint image b 1462 and the fingerprint image c 1463, the fingerprint image a 1461, the fingerprint image b 1462, and the fingerprint image c 1463 may be classified into one group.

Next, in operation 1405, the electronic device 101 (e.g., the clustering control module 740) may store the fingerprint data for each group. That is, the processor 440 (e.g., the clustering control module 740) may store the grouped fingerprint data in the memory 420. In other words, the processor 440 may store information about the grouping of the fingerprint data in the memory 420. At this time, the processor 440 (e.g., the clustering control module 740) may store the grouped fingerprint data in a first storage space (e.g., the cluster storage module 730) that is distinguished from a second storage space for registered fingerprint information. For example, as shown in FIG. 14E, the fingerprint images 1461 to 1466 may be stored as a first group 1410 for a thumb, and other fingerprint images may be stored as a second group 1420 for an index finger.

According to the procedure of FIG. 14A, the fingerprint data may be grouped. Grouping may be performed based on the degree of similarity. Various algorithms can be used to measure the degree of similarity. For example, an algorithm based on a local feature, an algorithm based on a global feature, an algorithm based on a sum of squared difference, an algorithm based on phase correlation, or an algorithm based on a combination of two or more thereof may be used.

Based on the local feature, the electronic device 101 (e.g., the clustering control module 740) may detect a local feature of the fingerprint image, such as an edge or a corner. Then, the electronic device 101 may discern the degree of similarity between the fingerprint images through comparison between the feature points. Specifically, the electronic device 101 may design a geometric model for comparison between the respective feature points and may discern the degree of similarity between the fingerprint images using a matching technique such as random sample consensus (RANSAC). For example, as the algorithm based on the local feature, techniques such as scale-invariant feature transform (SIFT), speeded up robust features (SURF), binary robust invariant scalable keypoints (BRISK), binary robust independent elementary features (BRIEF), and the like may be used. Also, as the geometric model, a projective method, an affine method, a similarity method, or an euclidean method may be used.

Based on the global feature, the electronic device 101 (e.g., the clustering control module 740) may expresses the entire fingerprint images in a histogram and may compare the distribution of brightness elements, thereby discerning the degree of similarity between the fingerprint images. Alternatively, the electronic device 101 may measure the degree of similarity by extending the algorithm based on the local feature to the entire image. For example, as the algorithm based on the global feature, a dense-SIFT technique may be used.

Based on the sum of the squared difference, the electronic device 101 (e.g., the clustering control module 740) may calculate difference values of pixels at the same position between the fingerprint images, and may sum the squares of difference values for each pixel position. Alternatively, the electronic device 101 may sum the absolute values of the difference values for each pixel position. Then, the electronic device 101 may measure the degree of similarity by comparing the summed results. When the summed result is lower than the threshold value, it may be determined to have similarity.

Based on the phase correlation, the electronic device 101 (e.g., the clustering control module 740) may perform a correlation operation on values of pixels constituting the fingerprint images. In other words, the electronic device 101 (e.g., the clustering control module 740) may fix one fingerprint image, may move the other fingerprint image little by little to calculate a phase difference, and may measure the degree of similarity using a difference value in a position where the phase difference is the smallest. In a case in which the fingerprint images are compared, the algorithm based on the phase correlation has a robust feature of changes in noise and brightness when using the phase difference in a frequency space.

As described above, the fingerprint data may be grouped. Accordingly, the fingerprint data for the same finger may be registered as one instance or piece of fingerprint information at the time of fingerprint registration thereafter. Further, the grouping of the fingerprint data may be used to discern whether the fingerprint data corresponds to the same user as well as the same finger. In other words, when considering that the electronic device 101 is used by a plurality of users, it cannot be guaranteed that the collected fingerprint data is derived from the fingerprint of one user. However, through the above-described grouping, that is, clustering, the fingerprint data of one user may be distinguished from the fingerprint data of another user. The fingerprint registration procedure using the grouped fingerprint data will be described below with reference to FIG. 15A.

Figure 15A:
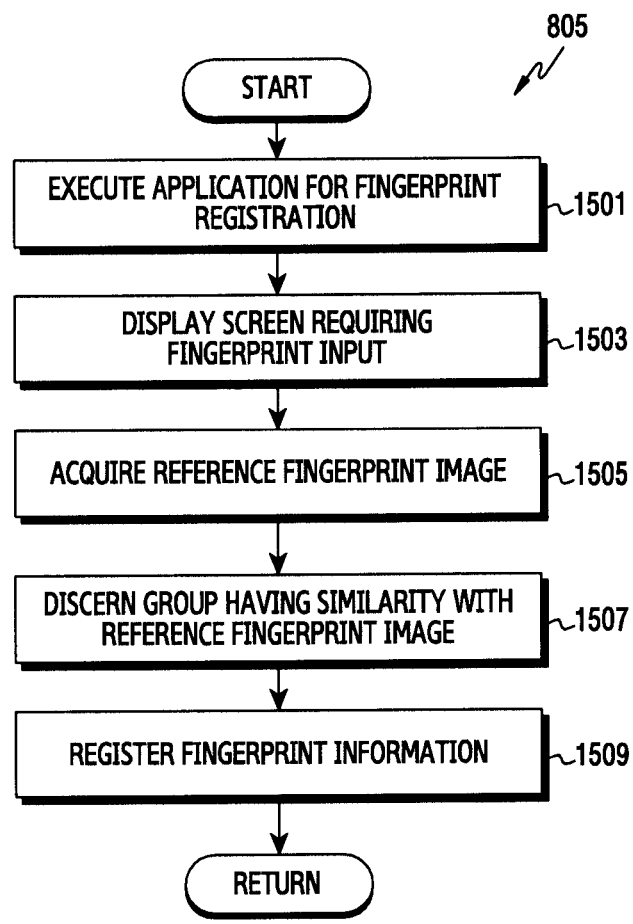
FIG. 15A is a flowchart illustrating a method of registering fingerprint information in an electronic device according to various embodiments of the present disclosure.

FIG. 15A is a flowchart illustrating a method of registering fingerprint information in an electronic device according to various embodiments of the present disclosure. The method is an example method of operating the electronic device 101.

Referring to FIG. 15A, in operation 1501, the electronic device 101 (e.g., the processor 440) may execute an application for fingerprint registration. The application for fingerprint registration may be executed by a user's command. Alternatively, the application for fingerprint registration may be executed in a process of installing or executing an application requiring security by biometric information. That is, the processor 440 may detect an execution event of the application for fingerprint registration and may execute the application for fingerprint registration.

Figure 15B:
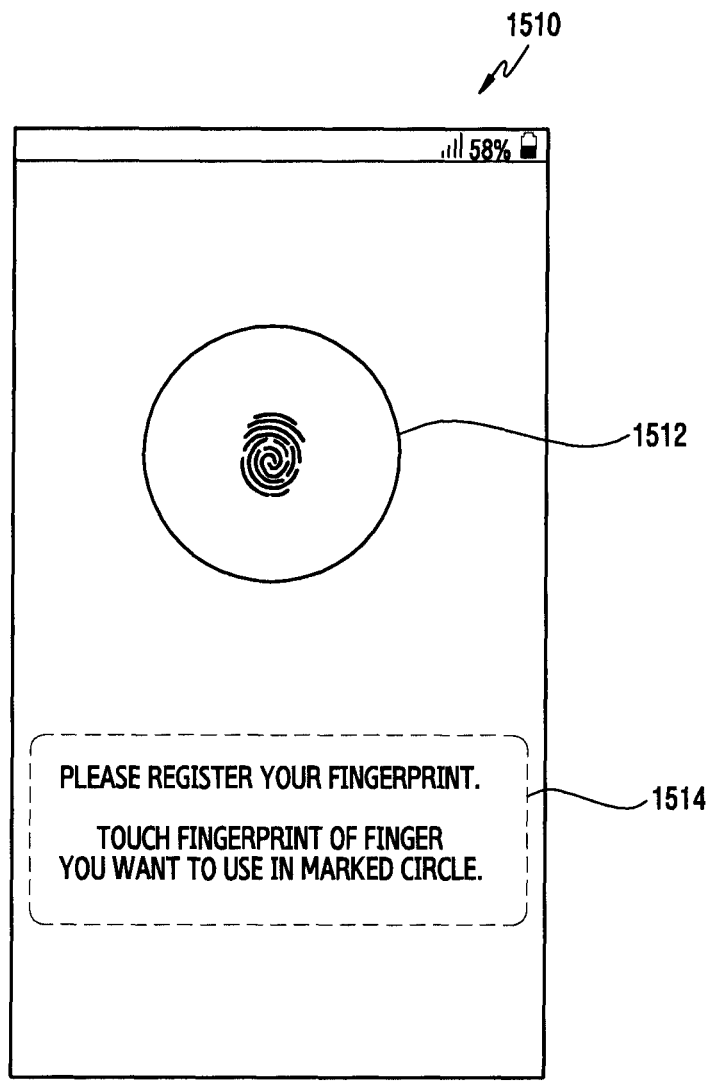
FIG. 15B illustrates an example of a user interface for registering fingerprint information in an electronic device according to various embodiments of the present disclosure.

Next, in operation 1503, the electronic device 101 (e.g., the processor 440) may display a screen requesting a fingerprint input. Upon fingerprint registration, the processor 440 may request at least one fingerprint input. Through this, the processor 440 may determine a reference fingerprint image for mapping with previously collected fingerprint data. For example, a screen as shown in FIG. 15B may be displayed. Referring to FIG. 15B, a screen 1510 may include an indicator 1512 for indicating the position of the fingerprint input and a guidance text 1514 for inducing the fingerprint input.

Next, in operation 1505, the electronic device 101 (e.g., the processor 440) may acquire a reference fingerprint image. That is, when a user's finger touches the fingerprint sensor 430 installed in the display 410, the processor 440 may acquire a fingerprint image of the user, which can be a reference fingerprint image. The reference fingerprint image may be used as a criterion for selecting one of fingerprint groups in the following operation.

Figure 15C:
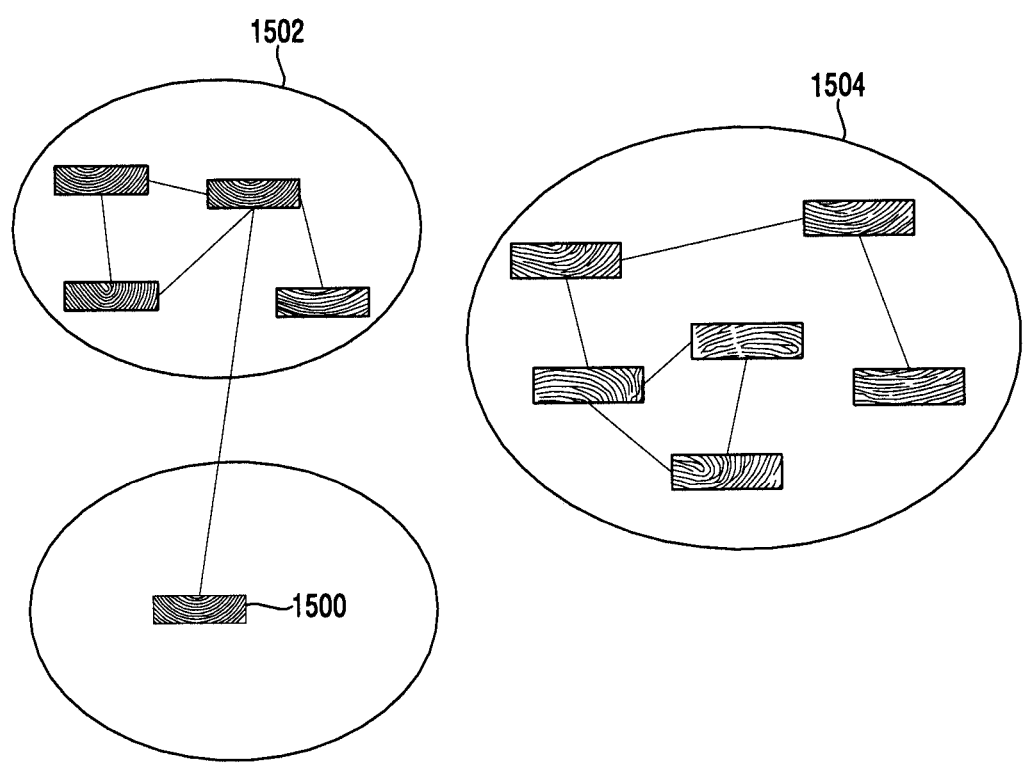
FIG. 15C illustrates an example of the configuration of fingerprint information in an electronic device according to various embodiments of the present disclosure.

Next, in operation 1507, the electronic device 101 (e.g., the processor 440) may discern a group having similarity with the reference fingerprint image. That is, the processor 440 may select one fingerprint group associated with the same finger and the same user as the reference fingerprint image among a plurality of fingerprint groups determined by classifying the fingerprint data. To this end, the processor 440 may calculate a degree of similarity between the stored fingerprint images and the reference fingerprint image. At this time, when the stored fingerprint image having a degree of similarity equal to or greater than the threshold value is detected, the processor 440 may select a group to which the detected fingerprint image belongs as a group having similarity with the reference fingerprint image. For example, in the case of FIG. 15C, the processor 440 may compare a reference fingerprint image 1500 with the stored fingerprint images. At this time, the similarity with one fingerprint image belonging to the first group 1502 among the fingerprint images belonging to the first group 1502 and the second group 1504 may be determined. Accordingly, the processor 440 may select the first group 1502.

Figure 15D:
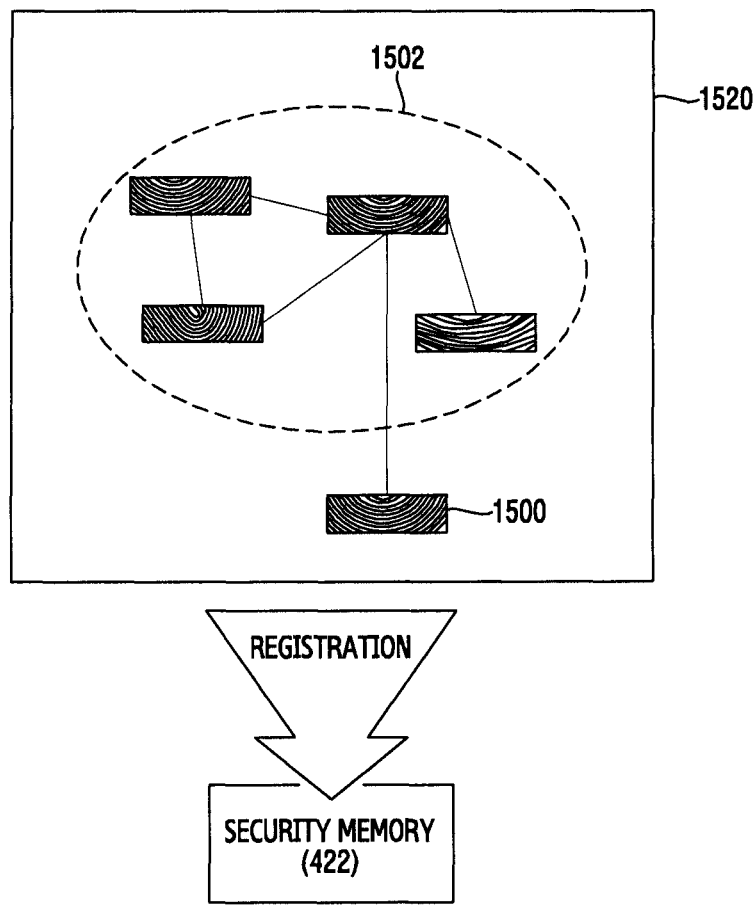
FIG. 15D illustrates an example of a registration result of fingerprint information in an electronic device according to various embodiments of the present disclosure.

Next, in operation 1509, the electronic device 101 (e.g., the processor 440) may register fingerprint information. That is, the processor 440 may determine, as the fingerprint information, a fingerprint image set including the reference fingerprint image and the fingerprint images belonging to the discerned group, and may store the determined fingerprint image in a predefined storage space (e.g., secure memory 422). For example, in the case of FIG. 15C, the first group 1502 and the reference fingerprint image 1500 may be registered as fingerprint information 1520, as shown in FIG. 15D. At this time, the registered fingerprint information may be stored in the separate second storage space (e.g., the security memory 422), which is distinguished from the first storage space in which the previously collected fingerprint data is stored. In this case, the fingerprint images belonging to the discerned group may be moved to the second storage space and may be discarded in the first storage space.

As described above, the various embodiments of the present disclosure may be related to a method and a device of acquiring the fingerprint information using a general application (e.g., a camera or telephone application) for another purpose other than the fingerprint application that performs fingerprint registration and authentication. The fingerprint sensor may be embedded in the display, so that the electronic device 101 may acquire the fingerprint data from a user touch input. Accordingly, when the fingerprint registration application is executed, in order to reduce the inconvenience of having to tap the finger on the fingerprint sensor 430 several times for the purpose of fingerprint registration, the electronic device 101 may acquire the fingerprint data through the general application executed before the execution of the fingerprint registration application, and may use the acquired fingerprint data at the time of fingerprint registration in the fingerprint registration application.

At the time of a touch input, a user may touch the fingerprint sensor embedded in the display with a plurality of fingers rather than a single finger. In this case, for optimum performance of a fingerprint recognizer, each finger should be individually registered so as to complete each template. Accordingly, the electronic device 101 may perform clustering on the fingerprint data input by the general application other than the fingerprint registration application through the degree of similarity, and then may store the clustered fingerprint data. Next, when there is a cluster associated with the fingerprint information acquired when the fingerprint registration application attempts to perform registration, the electronic device 101 may perform precise individual registration by selecting the fingerprint data. In addition, since the user can touch the fingerprint sensor embedded in the display with different fingers, the electronic device 101 may prevent the fingerprint from being erroneously input, using the cluster as described above.

Further, the electronic device 101 may acquire the fingerprint data of the user before performing a specific function, may compare the acquired fingerprint data with the previously registered fingerprint information, and then may control the specific function to be performed only when the fingerprint data is determined to be the fingerprint of an authorized user. This may prevent or reduce the occurrence of various malfunctions due to an input of an unauthorized user when the specific function is performed.

The method of operating the electronic device according to various embodiments may include an operation of displaying at least one object upon execution of an application, an operation of acquiring first fingerprint data including at least one fingerprint image in response to a touch input for the at least one object, and an operation of registering the first fingerprint data and a reference fingerprint data acquired through at least one other application as fingerprint information. Furthermore, the method of operating the electronic device may further include an operation of activating the fingerprint sensor in response to the occurrence of the touch input. In addition, the method of operating the electronic device may further include an operation of grouping the fingerprint data acquired through the application into a plurality of groups based on a degree of similarity so as to classify the fingerprint data for each finger. In addition, the method of operating the electronic device may further include an operation of displaying a screen requiring a fingerprint input in response to the execution of the at least one other application, and an operation of determining the fingerprint image acquired through the screen as the reference fingerprint data.

Hereinafter, with reference to FIG. 16, FIG. 17, and FIG. 18, the procedure for collecting the fingerprint data and registering the fingerprint information described above will be described in detail.

Figure 16:
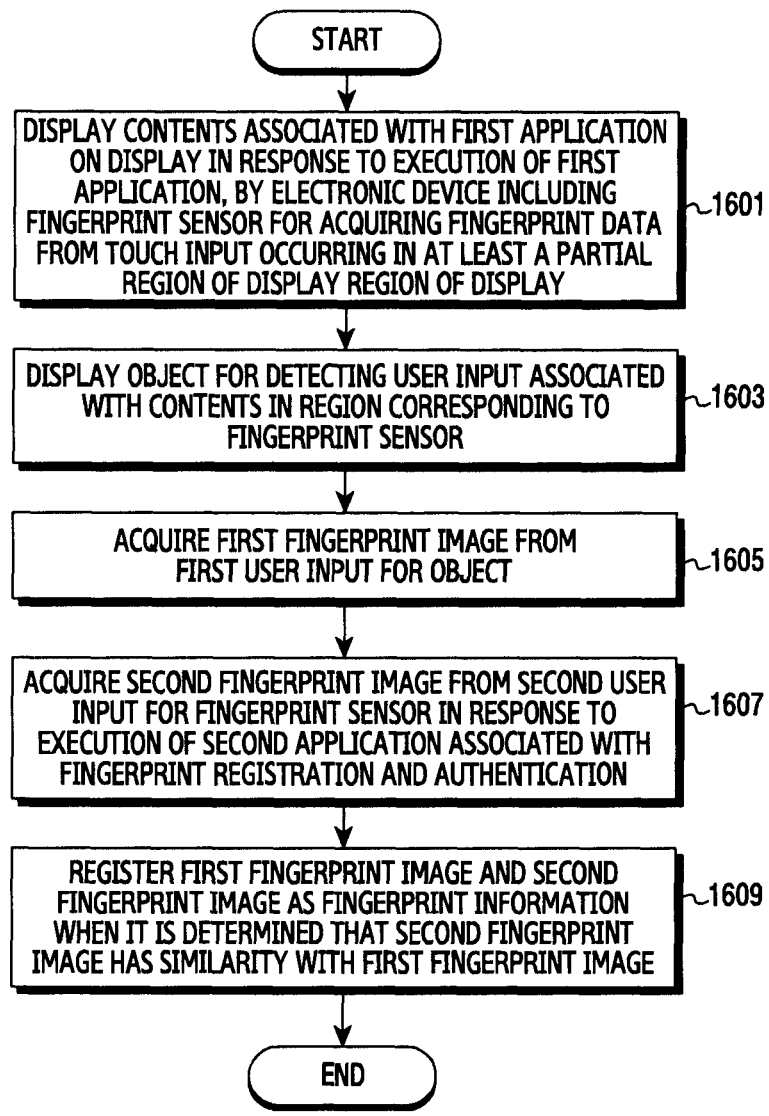
FIG. 16 is another flowchart illustrating a method of registering a fingerprint in an electronic device according to various embodiments of the present disclosure.

FIG. 16 is another flowchart illustrating a method of registering a fingerprint in an electronic device according to various embodiments of the present disclosure. FIG. 16 illustrates a method of operating the electronic device 101.

Referring to FIG. 16, in operation 1601, the electronic device 101 (e.g., the processor 440) that includes the fingerprint sensor 430 for acquiring fingerprint data from a touch input occurring in at least a partial region of a display region of the display 410 may display contents associated with a first application on the display 410 in response to the execution of the first application. Here, the first application may be a general application different from an application for fingerprint registration. For example, the first application may be a camera application, a recording application, a configuration application, or the like.

In operation 1603, the electronic device 101 (e.g., the processor 440) may display an object capable of detecting a user input associated with the contents in a region corresponding to the fingerprint sensor. For example, the object may be a button. Furthermore, the object may be a button associated with a main function of the first application.

In operation 1605, the electronic device 101 (e.g., the processor 440) may acquire a first fingerprint image from a first user input for the object. That is, when the touch input for the object occurs by a user, the processor 440 may acquire the first fingerprint image through the fingerprint sensor 430. At this time, the first fingerprint image may be compared with other previously stored fingerprint images, and may be grouped by the clustering control module 740.

In operation 1607, the electronic device 101 (e.g., the processor 440) may execute a second application associated with fingerprint registration and authentication, and may acquire a second fingerprint image from a second user input on the fingerprint sensor 430 in response to the execution of the second application. The second fingerprint image may be acquired through an interface provided by the second application.

In operation 1609, when it is determined that the second fingerprint image has similarity with the first fingerprint image, the electronic device 101 (e.g., the processor 440) may register the first fingerprint image and the second fingerprint image as fingerprint information. That is, the processor 440 may determine the first fingerprint image and the second fingerprint image as fingerprint data for the same finger, and may store the first fingerprint image and the second fingerprint image in a predefined storage space (e.g., the security memory 422).

Figure 17:
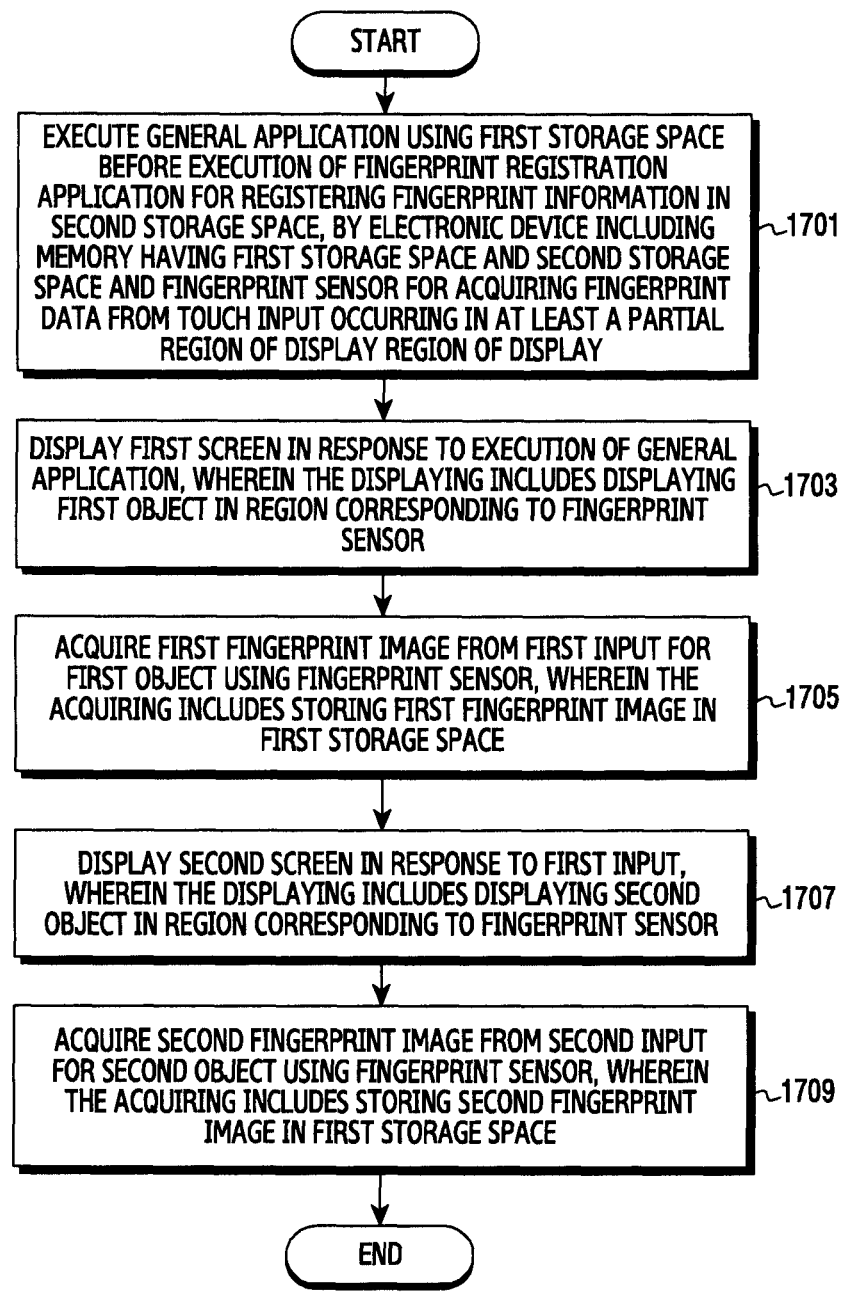
FIG. 17 is still another flowchart illustrating a method of registering a fingerprint in an electronic device according to various embodiments of the present disclosure.

FIG. 17 is still another flowchart illustrating a method of registering a fingerprint in an electronic device according to various embodiments of the present disclosure. FIG. 17 illustrates a method of operating the electronic device 101.

Referring to FIG. 17, in operation 1701, the electronic device 101 (e.g., the processor 440) that includes the memory 420 having a first storage space and a second storage space and the fingerprint sensor 430 for acquiring fingerprint data from a touch input occurring in at least a partial region of a display region of the display 410 may execute a general application using the first storage space before the execution of a fingerprint registration application that registers fingerprint information in the second storage space. For example, the general application may be a camera application, a recording application, a configuration application, or the like.

In operation 1703, the electronic device 101 (e.g., the processor 440) may display a first screen in response to the execution of the general application. Here, the displaying may include displaying a first object in a region corresponding to the fingerprint sensor 430. For example, the first object may be a button. Furthermore, the first object may be a button associated with a main function of the general application.

In operation 1705, the electronic device 101 (e.g., the processor 440) may acquire a first fingerprint image from a first input for the first object using the fingerprint sensor 430. Here, the acquiring the first fingerprint image may include storing the first fingerprint image in the first storage space. Here, the fingerprint sensor 430 may be in an inactive state when the general application is executed and may be activated when the first input occurs.

In operation 1707, the electronic device 101 (e.g., the processor 440) may display a second screen in response to the first input. Here, the displaying may include displaying a second object in a region corresponding to the fingerprint sensor.

In operation 1709, the electronic device 101 (e.g., the processor 440) may acquire a second fingerprint image from a second input for the second object using the fingerprint sensor 430. Here, the acquiring the second fingerprint image may include storing the second fingerprint image in the first storage space. Here, the first storage space may refer to another storage space distinguished from the storage space for storing the registered fingerprint information.

Figure 18:
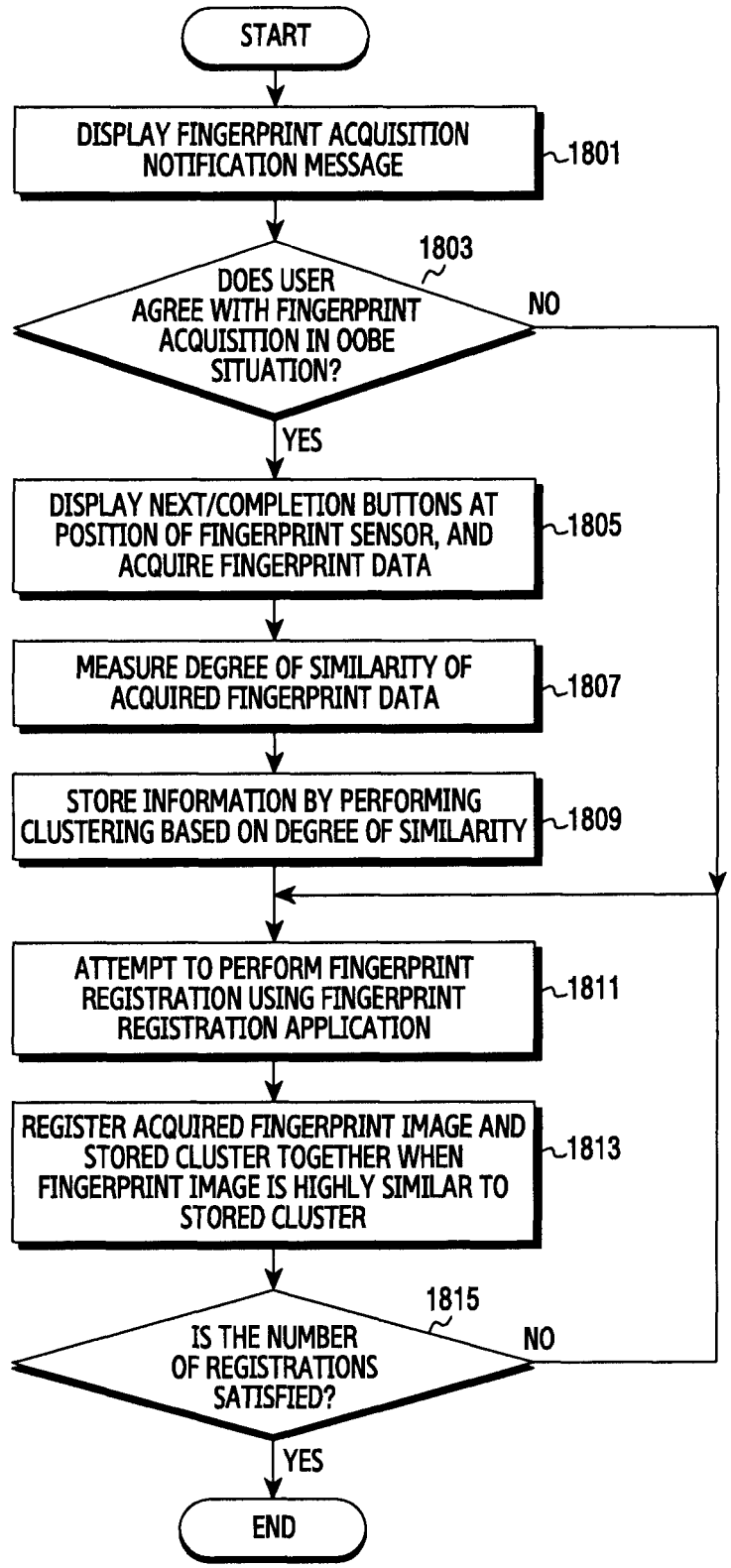
FIG. 18 is yet another flowchart illustrating a method of registering a fingerprint in an electronic device according to various embodiments of the present disclosure.

FIG. 18 is yet another flowchart illustrating a method of registering a fingerprint in an electronic device according to various embodiments of the present disclosure. FIG. 18 illustrates a method of operating the electronic device 101, as a procedure of acquiring fingerprint data through a configuration procedure of OOBE.

Referring to FIG. 18, in operation 1801, the electronic device 101 (e.g., the processor 440) may display a fingerprint acquisition notification message. In other words, the processor 440 may display a screen informing that the fingerprint data should be collected during the configuration procedure in an OOBE situation. For example, the screen may include a guidance text 942 shown in FIG. 9C.

In operation 1803, the electronic device 101 (e.g., the processor 440) may discern whether a user agrees with fingerprint acquisition in the OOBE situation. That is, the screen displayed in operation 1801 may include an object for discerning whether the user agrees with fingerprint acquisition. The processor 440 may determine whether the user agrees with fingerprint acquisition through an input for the object. When the user does not agree with fingerprint acquisition, the electronic device 101 may skip the following operations 1805 to 1809 and may proceed to operation 1811.

On the other hand, in operation 1805, when the user agrees with fingerprint acquisition, the electronic device 101 (e.g., the processor 440) may display next/completion buttons at the position of the fingerprint sensor 430 and may acquire fingerprint data. At this time, the processor 440 may adaptively control the operation state of the fingerprint sensor 430. For example, in response to the occurrence of a touch input at the next/completion buttons, the electronic device 101 may activate the fingerprint sensor 430.

In operation 1807, the electronic device 101 (e.g., the processor 440, clustering control module 740) may measure a degree of similarity of the acquired fingerprint data. The degree of similarity of the fingerprint data may be measured every time the fingerprint image is acquired, or may be measured collectively after the configuration procedure is completed, or may be periodically measured during the configuration procedure, or may be measured every time a predetermined number of fingerprint images are acquired during the configuration procedure. At this time, the clustering control module 740 may measure the degree of similarity according to an algorithm based on a local feature, an algorithm based on a global feature, an algorithm based on a sum of squared difference, an algorithm based on phase correlation, or an algorithm based on a combination of two or more thereof.

In operation 1809, the electronic device 101 (e.g., the processor 440, clustering control module 740) may store information by performing clustering based on the degree of similarity. In other words, the clustering control module 740 may classify fingerprint images into a plurality of groups based on the degree of similarity between the fingerprint data, and may store the fingerprint images for each group. At this time, the fingerprint images may be stored in another storage space distinguished from the storage space used in fingerprint registration in the following operation 1813.

In operation 1811, the electronic device 101 (e.g., the processor 440) may attempt to perform fingerprint registration using a fingerprint registration application. That is, the processor 440 may execute the fingerprint registration application in response to a user input and may perform a procedure for registering fingerprint information. Specifically, the processor 440 may request a fingerprint input for registration and may acquire at least one fingerprint image.

In operation 1813, when the acquired at least one fingerprint image is highly similar to a stored cluster, the electronic device 101 (e.g., the processor 440) may register the acquired at least one fingerprint image and the stored cluster together. In other words, the at least one fingerprint image acquired in operation 1811 may be used as a reference fingerprint image, and when there is a cluster including the fingerprint image that is similar to the reference fingerprint image above a certain level, the processor 440 may register the fingerprint images belonging to the corresponding cluster and the at least one fingerprint image acquired in operation 1811, as the fingerprint information.

In operation 1815, the electronic device 101 (e.g., the processor 440) may determine whether the number of registrations is satisfied. That is, the processor 440 may determine whether a sufficient number of fingerprint images for fingerprint registration are acquired. When a larger number of fingerprint images are needed, the electronic device 101 may return to operation 1811 to request a fingerprint input from the user.

The term "module" as used herein may include a unit or circuit consisting of hardware, software code stored in memory, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a compiler or a code that can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Methods stated in claims and/or specification according to various embodiments may be implemented by hardware, using software, or using a combination of hardware and software.

When the methods are implemented using software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

Therefore, a non-transitory computer readable medium according to an embodiment may include a plurality of instructions. Here, when the plurality of instructions is executed by a processor, the plurality of instructions may be configured to allow the processor to perform an operation of displaying an object for a first application in a partial region in which a fingerprint sensor for acquiring fingerprint data through at least a partial region of a display region of a display is installed, an operation of acquiring fingerprint data including at least one fingerprint image in response to a touch input for the object, and an operation of registering the fingerprint data and a reference fingerprint image acquired through a second application as fingerprint information. Furthermore, the plurality of instructions may be configured to allow the processor to further perform an operation of activating the fingerprint sensor in response to the occurrence of the touch input.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access, via an external port, the electronic device that performs embodiments of the present disclosure. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Meanwhile, although the concrete embodiments of the present disclosure have been described in the detailed description of the present disclosure, various modifications can be made without departing from the scope of the present disclosure. Therefore, the scope of the present disclosure should not be limited to the aforementioned embodiments, but should be defined by the appended claims and their equivalents.

What is claimed is:

1. An electronic device comprising:
   a display;
   a fingerprint sensor configured to acquire fingerprint data through a display region, the display region being at least a partial region of the display;
   a memory configured to store an out-of-box experience (OOBE) application and a fingerprint registration application; and
   a processor configured to:
      upon an initial use of the electronic device, execute the OOBE application to display a screen unrelated to fingerprint registration, the screen including a first graphical object displayed at a region of the display corresponding to the display region of the fingerprint sensor;
      acquire at least one first fingerprint data from a first user input on the first graphical object using the fingerprint sensor;
      execute the fingerprint registration application, wherein the execution thereof includes acquiring second fingerprint data from a second user input on the display region; and
      generate fingerprint information about a user using the at least one first fingerprint data and the second fingerprint data.

2. The electronic device of claim 1, wherein the processor is configured to activate a designated function of the OOBE application in response to the first user input.

3. The electronic device of claim 1, wherein the processor is configured to display a first object as the first graphical object when the designated function is a first designated function, and to display a second object as the first graphical object when the designated function is a second designated function.

4. The electronic device of claim 1, wherein the processor is configured to display a second graphical object at a region of the display corresponding to the display region in response to the first user input.

5. The electronic device of claim 4, wherein the second user input is made on the second graphical object and the processor is configured to acquire the second fingerprint data from the second user input made on the second graphical object using the fingerprint sensor.

6. The electronic device of claim 1, wherein:
   the first fingerprint data corresponds to a first finger of the user and the second fingerprint data corresponds to a second finger of the user, and
   the processor is configured to select particular fingerprint data having a designated range of relevance to one another among the first fingerprint data and the second fingerprint data, as at least a part of the generating the fingerprint information.

7. The electronic device of claim 6, wherein the processor is configured to generate the particular fingerprint data and the second fingerprint data as the fingerprint information for the user.

8. The electronic device of claim 1, wherein the processor is configured to select the first graphical object for use in fingerprint data acquisition based on a priority among a plurality of objects.

9. The electronic device of claim 1, wherein:
   the memory includes a first memory and a second memory having different security levels, and
   the processor is configured to store the first fingerprint data in a first memory, as at least a part of the fingerprint information generation and to store the first fingerprint data and the second fingerprint data in a second memory, as the at least a part of the fingerprint information generation.

10. The electronic device of claim 9, wherein the processor is configured to discard the first fingerprint data stored in the first memory.

11. An electronic device comprising:
    a display controlled to display at least one object;
    a fingerprint sensor configured to acquire fingerprint data through at least a partial region of a display region of the display; and
    a processor is configured to:
       upon an initial use of the electronic device, cause the display to display the at least one object when an out-of-box experience (OOBE) application is executed to display a first screen unrelated to fingerprint registration, wherein the at least one object is displayed at a region of the display corresponding to the partial region of the fingerprint sensor;
       acquire first fingerprint data representing at least one fingerprint image in response to a touch input on the at least one object; and
       register the first fingerprint data and reference fingerprint data acquired through at least one other application as fingerprint information.

12. The electronic device of claim 11, wherein the processor activates the fingerprint sensor in response to occurrence of the touch input.

13. The electronic device of claim 11, wherein the processor is further configured to:
    activate a fingerprint data collection function using a general application other than the OOBE application when the first fingerprint data acquired through the OOBE application represents a smaller number of fingerprint images than a threshold value.

14. The electronic device of claim 11, wherein the processor groups the first fingerprint data acquired through the OOBE application into a plurality of groups based on a degree of similarity to classify the fingerprint information for each finger.

15. The electronic device of claim 14, wherein the processor allows the at least one fingerprint image included in a group having a degree of similarity equal to or higher than a predetermined level with the reference fingerprint data among the plurality of groups, to be included in the fingerprint information.

16. The electronic device of claim 11, wherein the processor is further configured to:
   control the display to display a second screen requiring a fingerprint input, in response to execution of the at least one other application, and
   determine fingerprint image data acquired through the second screen as the reference fingerprint data.

17. The electronic device of claim 11, wherein the fingerprint information is stored in a separate storage space distinguished from the first fingerprint data acquired through the OOBE application.

18. A method of operating an electronic device comprising:
   upon an initial use of the electronic device, displaying at least one object when an out-of-box experience (OOBE) application is executed to display a first screen unrelated to fingerprint registration, wherein the at least one object is displayed at a region of the display corresponding to a partial region of a fingerprint sensor;
   acquiring first fingerprint data representing at least one fingerprint image in response to a touch input on the at least one object; and
   registering the first fingerprint data and reference fingerprint data acquired through at least one other application as fingerprint information.

19. The method of operating an electronic device of claim 18, further comprising:
   grouping the first fingerprint data acquired through the OOBE application into a plurality of groups based on a degree of similarity to classify the fingerprint information for each finger.

20. A non-transitory computer-readable medium storing instructions that when executed by a processor, implement the method of claim 18.

* * * * *